United States Patent
Morita et al.

(10) Patent No.: US 9,772,599 B2
(45) Date of Patent: Sep. 26, 2017

(54) DRIVING FORCE TRANSMISSION UNIT AND IMAGE FORMING APPARATUS INCLUDING SAME

(71) Applicants: Yoshiaki Morita, Kanagawa (JP); Takahiro Konishi, Kanagawa (JP)

(72) Inventors: Yoshiaki Morita, Kanagawa (JP); Takahiro Konishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 434 days.

(21) Appl. No.: 14/329,021

(22) Filed: Jul. 11, 2014

(65) Prior Publication Data
US 2015/0050080 A1 Feb. 19, 2015

(30) Foreign Application Priority Data
Aug. 13, 2013 (JP) .................................. 2013-168398

(51) Int. Cl.
*G03G 21/16* (2006.01)
*G03G 15/00* (2006.01)
*F16D 1/10* (2006.01)

(52) U.S. Cl.
CPC ....... *G03G 21/1647* (2013.01); *G03G 15/757* (2013.01); *F16D 2001/102* (2013.01); *Y10T 403/70* (2015.01)

(58) Field of Classification Search
CPC ...... G03G 15/00; G03G 15/757; G03G 15/08; F16D 47/02; F16D 2001/102; F16D 1/10; F16D 1/101; F16D 1/076
See application file for complete search history.

(56) References Cited

U.S. PATENT DOCUMENTS

| 4,074,946 A * | 2/1978 | Swearingen .......... F04D 29/266 192/69.8 |
| 6,892,042 B2 * | 5/2005 | Jang ........................ F16D 1/101 399/120 |
| 7,603,059 B2 * | 10/2009 | Marumoto ........... G03G 15/757 192/56.61 |

(Continued)

FOREIGN PATENT DOCUMENTS

| JP | 200272766 A | 3/2002 |
| JP | 2003-278886 | 10/2003 |

(Continued)

OTHER PUBLICATIONS

Japanese Office Action dated Apr. 7, 2017 issued in corresponding Japanese Application No. 2013-168398.

*Primary Examiner* — Daniel Wiley
(74) *Attorney, Agent, or Firm* — Harness, Dickey & Pierce P.L.C.

(57) ABSTRACT

A driving force transmission unit includes a first coupling, a second coupling, and a first rotary shaft. The first coupling includes a first contact portion and a hole, the inner circumferential surface of which has a rounded rectangular shape in cross section including a circular arc portion. The second coupling includes a second contact portion disposed at a position facing the first contact portion to contact the first contact portion along a direction of rotation of the second coupling. The first rotary shaft is connected to the first coupling and includes a shaft portion, an outer circumferential surface which has a rounded rectangular shape in cross section including a circular arc portion inserted into the hole of the first coupling.

12 Claims, 31 Drawing Sheets

(56) References Cited

U.S. PATENT DOCUMENTS

| | | | | |
|---|---|---|---|---|
| 7,664,431 B2* | 2/2010 | Jang | ................ | G03G 15/757 |
| | | | | 399/167 |
| 7,890,025 B2* | 2/2011 | Chadani | ................ | F16D 3/04 |
| | | | | 399/111 |
| 8,233,836 B2* | 7/2012 | Morimoto | ............ | F16D 1/0829 |
| | | | | 384/276 |
| 8,244,159 B2* | 8/2012 | Woo | ................ | G03G 21/186 |
| | | | | 399/167 |
| 8,428,492 B2* | 4/2013 | Lui | ................ | G03G 15/757 |
| | | | | 399/167 |
| 8,814,710 B2* | 8/2014 | Zhao | ................ | F16D 11/00 |
| | | | | 464/157 |
| 9,134,680 B2* | 9/2015 | Morita | ............ | G03G 15/757 |
| 2014/0140729 A1 | 5/2014 | Morita | | |

FOREIGN PATENT DOCUMENTS

| | | |
|---|---|---|
| JP | 2007-240007 | 9/2007 |
| JP | 2014-102435 | 6/2014 |

* cited by examiner

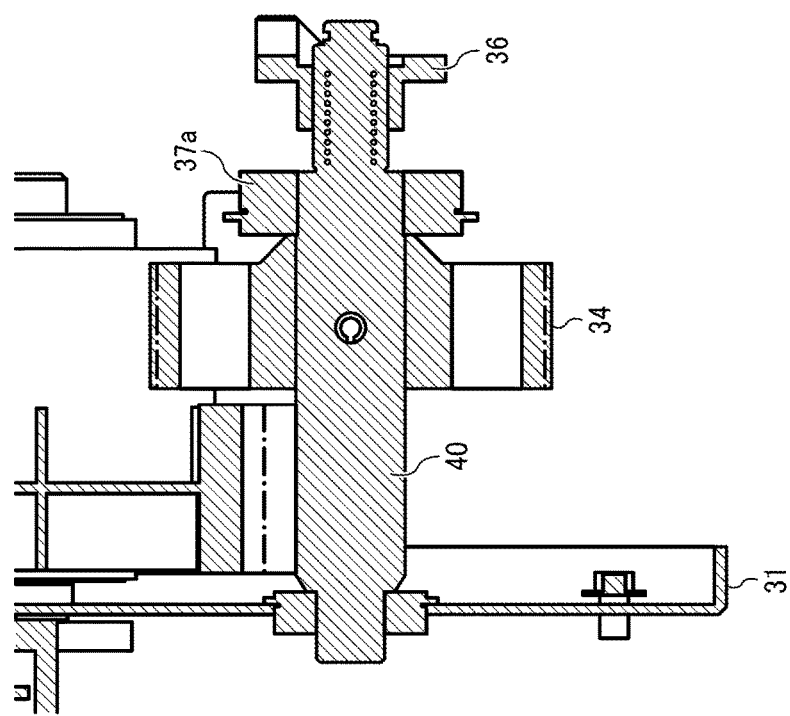
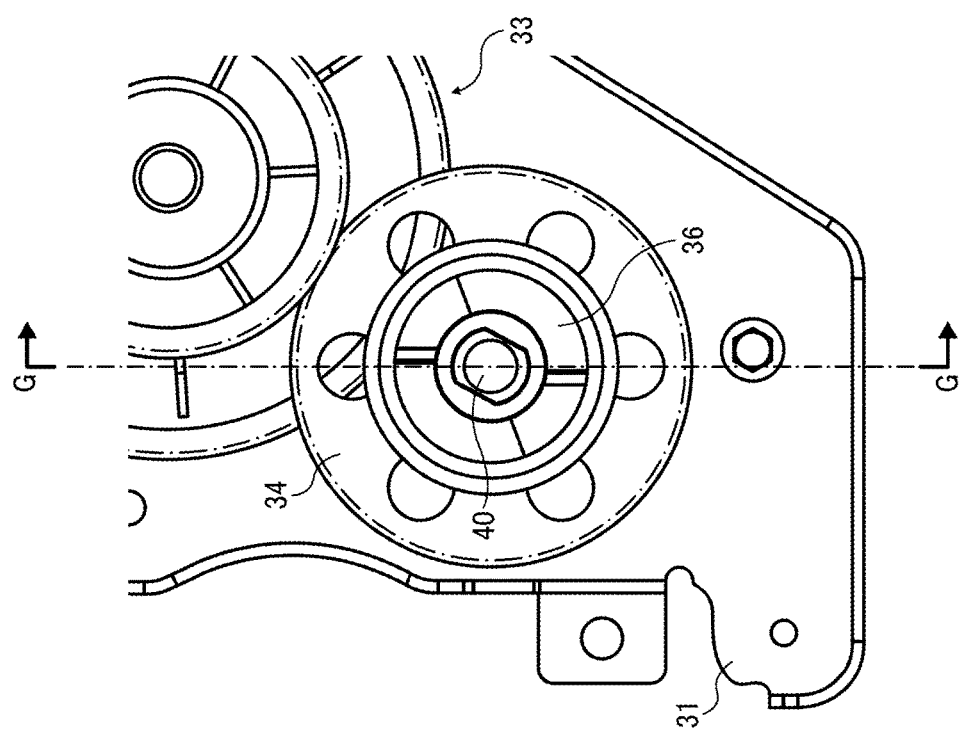

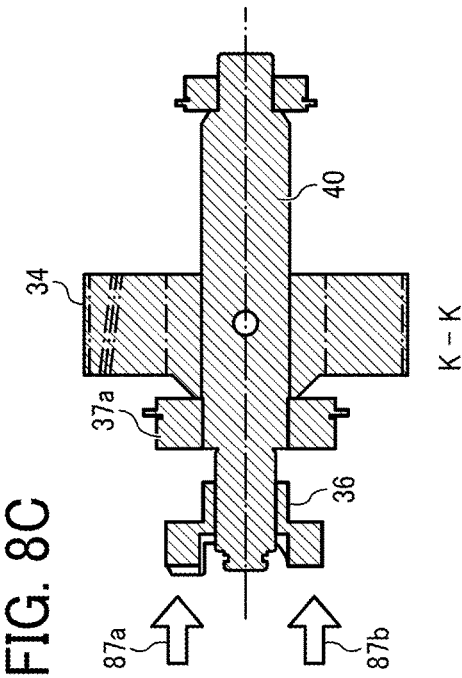
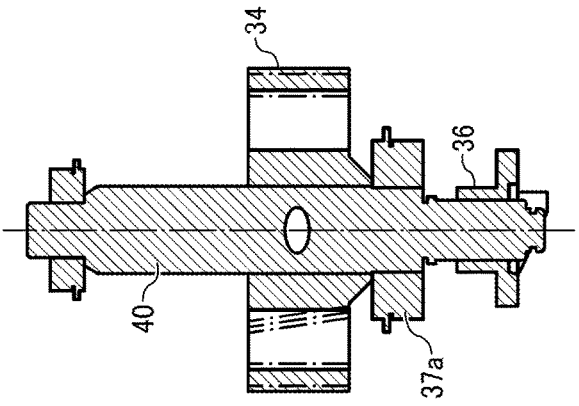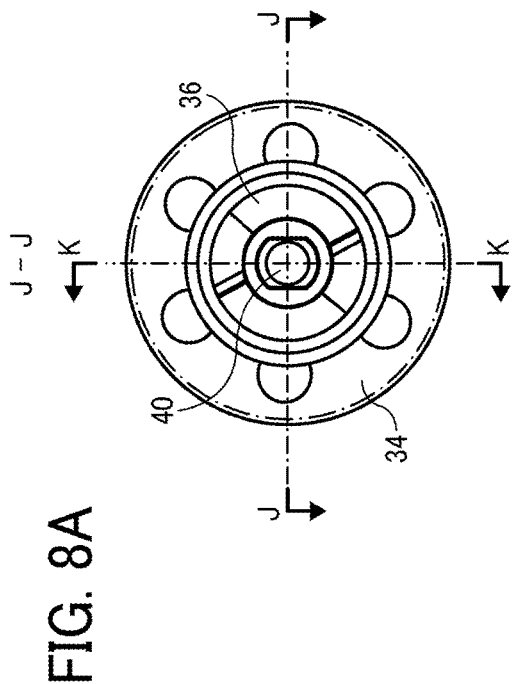
FIG. 8B
FIG. 8C
FIG. 8A

DRIVING FORCE TRANSMISSION UNIT AND IMAGE FORMING APPARATUS INCLUDING SAME

CROSS-REFERENCE TO RELATED APPLICATIONS

This patent application is based on and claims priority pursuant to 35 U.S.C. §119 to Japanese Patent Application No. 2013-168398, filed on Aug. 13, 2013, in the Japan Patent Office, the entire disclosure of which is hereby incorporated by reference herein.

BACKGROUND

Technical Field

Exemplary aspects of the present invention generally relate to a driving force transmission unit to transmit a rotary driving force from a drive source to a target and an image forming apparatus including the driving force transmission unit, and more particularly to an image forming apparatus such as a copier, a facsimile machine, or a printer.

Description of the Related Art

Generally, a driving force transmission unit includes a connecting mechanism that connects a drive shaft on a drive side and a driven shaft on a drive target side such as a roller and a drum. The connecting mechanism is generally provided on a transmission path through which a rotary driving force from a drive source is transmitted to the drive target. Such a known connecting mechanism consists of a pair of couplings (also known as joints) with contact portions at shaft end portions of the drive shaft and the driven shaft facing each other that contact upon transmission of rotary driving force. The contact portions include claws or concave and convex portions that contact one another upon transmission of rotary driving force.

In another known driving force transmission unit, in order to transmit the rotary driving force from the drive shaft to the coupling on the drive side while the axis of the coupling on the drive side is aligned with the drive shaft, the outer circumferential surface of the drive shaft has a rounded rectangular shape in cross-section and the inner circumferential surface of the coupling on the drive side in which the drive shaft is inserted has a rounded rectangle hole in cross-section. The axis of the drive shaft and the axis of the coupling on the drive side are aligned with respect to the shaft portion of the drive shaft having a circular arc shape in cross section and a hole of the coupling on the drive side having a circular arc shape in cross section. The rotary driving force is transmitted from the drive shaft to the coupling on the drive side through the linear-shaped portion of the drive shaft in cross-section and the linear-shaped portion of the hole of the joint on the drive side. As the drive shaft rotates, the rotary driving force is transmitted to the coupling via the linear shaped portions of the drive shaft and the hole of the coupling.

SUMMARY

In view of the foregoing, in an aspect of this disclosure, there is provided an improved driving force transmission unit including a first coupling, a second coupling, and a first rotary shaft. The first coupling transmits a rotary driving force and includes a first contact portion and a hole, the inner circumferential surface of which has a rounded rectangular shape in cross section including a circular arc portion. The second coupling includes a second contact portion disposed at a position facing the first contact portion to contact the first contact portion along a direction of rotation of the second coupling. The first rotary shaft is connected to the first coupling and includes a shaft portion, an outer circumferential surface which has a rounded rectangular shape in cross section including a circular arc portion inserted into the hole of the first coupling. The first contact portion is disposed between a first imaginary line extending from a center of rotation of the first rotary shaft passing through one end of the circular arc portion of the first rotary shaft and a second imaginary line extending from the center of rotation of the first rotary shaft passing through the other end of the circular arc portion in a direction of rotation of the first rotary shaft, and within a first area including the circular arc portion of the hole as viewed from the second coupling side.

The aforementioned and other aspects, features and advantages would be more fully apparent from the following detailed description of illustrative embodiments, the accompanying drawings and the associated claims.

BRIEF DESCRIPTION OF THE SEVERAL VIEWS OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein:

FIG. 7A is a partial front view schematically illustrating the structure around the drive shaft in the driving force transmission unit according to an illustrative embodiment of the present disclosure;

FIG. 7B is a cross-sectional view schematically illustrating the drive shaft and a center axis as viewed along a line G-G in FIG. 7A.

FIG. 8A is a front view schematically illustrating the drive shaft and the drive joint in the driving force transmission unit according to an illustrative embodiment of the present disclosure;

FIG. 8B is a cross-sectional view schematically illustrating the drive shaft and the center axis as viewed along a line J-J in FIG. 8A;

FIG. 8C is a cross-sectional view schematically illustrating the drive shaft and the center axis as viewed along a line K-K in FIG. 8A;

DETAILED DESCRIPTION

Figure 1:
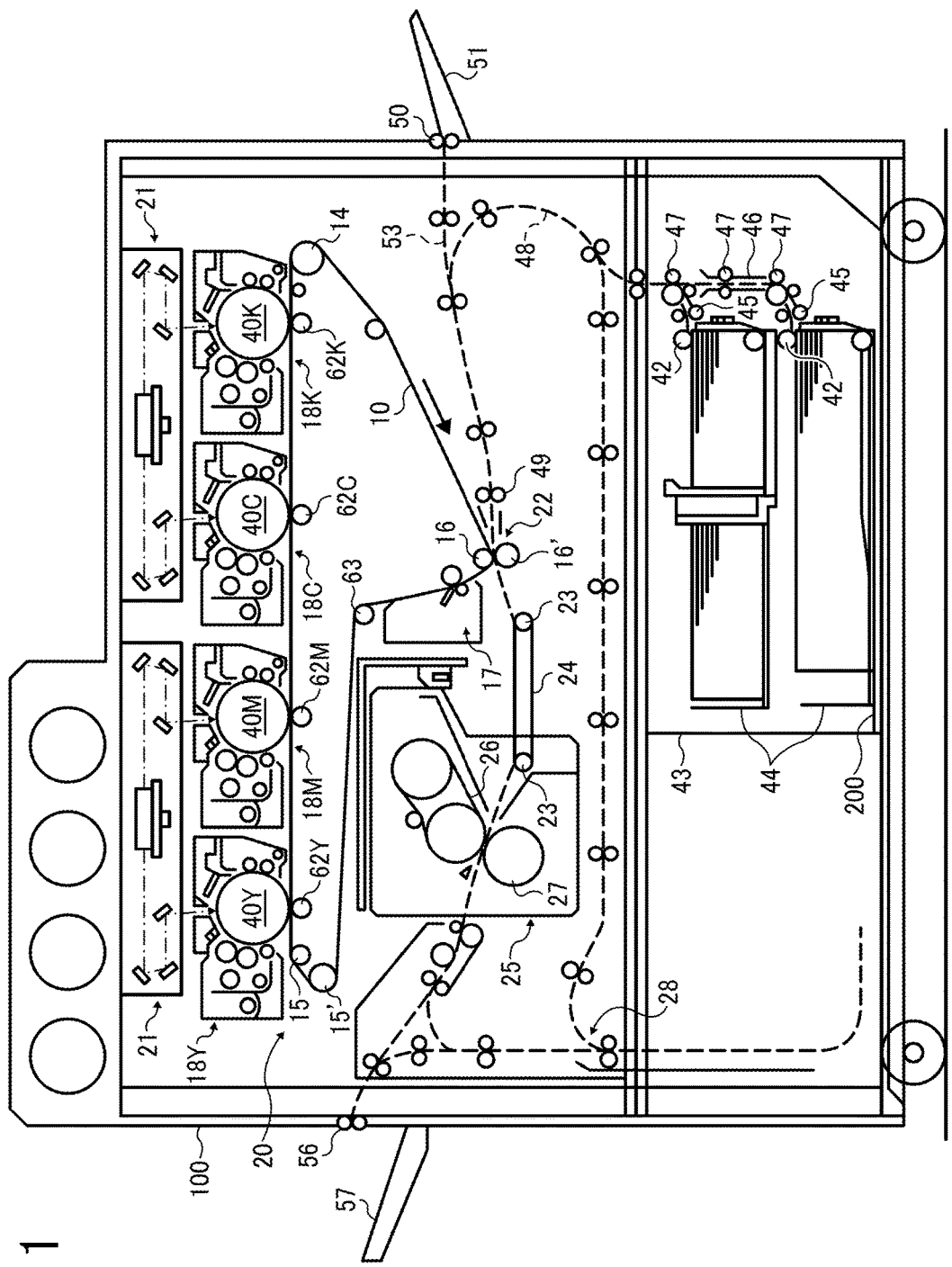
FIG. 1 is a schematic diagram illustrating an example of an electrophotographic image forming apparatus according to an illustrative embodiment of the present disclosure.

A description is now given of illustrative embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but include other printable media as well.

Referring now to the drawings, wherein like reference numerals designate identical or corresponding parts throughout the several views, exemplary embodiments of the present patent application are described.

Referring now to FIG. 1, there is provided a schematic diagram illustrating an example of an electrophotographic image forming apparatus according to an illustrative embodiment of the present disclosure.

The image forming apparatus shown in FIG. 1 is a tandem-type image forming apparatus including a main body 100 disposed on a sheet feeding unit 200 which stores multiple recording media. It is to be noted that suffixes Y, M, C, and, K denote colors yellow, magenta, cyan, and black, respectively. To simplify the description, the suffixes Y, M, C, and, K indicating colors are omitted herein unless otherwise specified.

In the main body 100 of the image forming apparatus, an intermediate transfer belt 10 serving as a belt-type image bearing member is entrained around a plurality of support rollers 14, 15, 15', 16, and 63, and is formed into an endless loop. The intermediate transfer belt 10 is movable in a clockwise direction in FIG. 1. In FIG. 1, a belt cleaning device 17 is disposed at the left side of a secondary-transfer opposing roller 16 which serves as one of the support rollers. The belt cleaning device 17 removes residual toner remaining on the intermediate transfer belt 10 after image transfer.

The intermediate transfer belt 10 is stretched taut between the support rollers 14 and 15. The image forming apparatus includes a tandem image forming unit 20 in which toner image forming stations 18Y, 18M, 18C, and 18K, one for each of the colors yellow, magenta, cyan, and black, are arranged in horizontally tandem above the looped intermediate transfer belt 10 along the direction of movement of the intermediate transfer belt 10.

As illustrated in FIG. 1, an optical writing unit or an exposure unit 21 serving as an optical writing mechanism is disposed above the tandem image forming unit 20. The toner image forming stations 18Y, 18M, 18C, and 18K in the tandem image forming unit 20 include photosensitive drums 40Y, 40M, 40C, and 40K, one for each of the colors yellow, magenta, cyan, and black, respectively. Latent images of the colors yellow, magenta, cyan, and black are formed on the photosensitive drums 40Y, 40M, 40C, and 40K, respectively. Each surface of the photosensitive drums 40Y, 40M, 40C, and 40K is charged uniformly by charging devices. Subsequently, based on image data, the photosensitive drums 40Y, 40M, 40C, and 40K are exposed by the optical writing unit (exposure unit) 21, thereby forming the latent images on the respective photosensitive drums 40Y, 40M, 40C, and 40K.

The latent images on the photosensitive drums 40Y, 40M, 40C, and 40K are developed with respective color of toner by development devices, thereby forming visible images, also known as toner images, on the surface of the photosensitive drums 40Y, 40M, 40C, and 40K. Primary transfer rollers 62Y, 62M, 62C, and 62K constituting a transfer device are disposed opposite the photosensitive drums 40Y, 40M, 40C, and 40K with the intermediate transfer belt 10 interposed therebetween, thereby forming primary transfer nips at which toner images are transferred from the photosensitive drums 40Y, 40M, 40C, and 40K onto the intermediate transfer belt 10. The support roller 14 in FIG. 1 is a drive roller that rotates the intermediate transfer belt 10. When forming a single color image of black color, rollers other than the drive roller 14, i.e., the support rollers 15 and 15', are moved such that the photosensitive drums 40Y, 40M, and 40C for the colors yellow, magenta, and cyan are separated from the intermediate transfer belt 10.

A secondary transfer device 22 is disposed opposite the tandem image forming unit 20 via the intermediate transfer belt 10. The secondary transfer device 22 includes a secondary-transfer opposing roller 16 and a secondary transfer roller 16'. In FIG. 1, the secondary transfer roller 16' is pressed against the secondary-transfer opposing roller 16 to apply a transfer electric field thereto. Accordingly, a toner image on the intermediate transfer belt 10 is transferred onto a recording medium.

A fixing device 25 is disposed next to the secondary transfer device 22. The fixing device 25 serving as a fixing mechanism fixes the toner image transferred on the recording medium. The fixing device 25 includes a fixing belt 26 and a pressing roller 27. The fixing belt 26 is formed into an endless loop to transport a recording medium. The pressing roller 27 as a pressing member is pressed against the fixing belt 26. A conveyor belt 24 serving as a recording medium transport member is entrained around support rollers 23 and rotated. The recording medium after the toner image is transferred thereto is transported to the fixing device 25.

An example of the image forming apparatus illustrated in FIG. 1 includes a sheet reversing unit 28 substantially below the secondary transfer device 22 and the fixing device 25, parallel to the tandem image forming unit 20. The sheet reversing unit 28 reverses a recording medium to form images on both sides of the recording medium.

In the image forming apparatus described above, image data is sent to the main body 100 of the image forming apparatus. Upon receiving a signal to start image formation, a drive motor, not shown, drives the support roller 14 to rotate, causing other support rollers to follow its rotation. Accordingly, the intermediate transfer belt 10 is moved. In the meantime, the toner image forming stations 18Y, 18M, 18C, and 18K form single-color toner images yellow, magenta, cyan, and black on the photosensitive drums 40Y, 40M, 40C, and 40K, respectively. As the intermediate transfer belt 10 moves, the single-color images are transferred from the photosensitive drums 40Y, 40M, 40C, and 40K onto the intermediate transfer belt 10 at the primary transfer nips or primary transfer portions opposite the primary transfer rollers 62Y, 62M, 62C, and 62K such that the toner images are superimposed one atop the other, thereby forming a composite toner image on the intermediate transfer belt 10.

In the sheet feeding unit 200, one of sheet feed rollers 42 is selectively rotated so as to feed a recording medium from one of sheet cassettes 44 disposed in a paper bank 43. A separation roller 45 separates the recording medium one by one from the stack and feeds it to a sheet delivery path 46. Then, the recording medium is guided to a sheet delivery path 48 in the main body 100 of the image forming apparatus by transport rollers 47 and contacts a pair of registration rollers 49. The pair of registration rollers 49 stops rotating. Alternatively, a sheet feed roller 50 is rotated to pick up a recording medium on a side tray 51 disposed at the lateral side of the main body 100. The recording medium is fed to a manual feed path 53 by the separation roller one by one. In this configuration, the recording medium also comes into contact with the pair of registration rollers 49, and the pair of registration rollers 49 stops.

Subsequently, the pair of registration rollers 49 rotates again in appropriate timing such that the recording medium is aligned with the composite toner image formed on the intermediate transfer belt 10 and sent to a secondary transfer nip at which the intermediate transfer belt 10 and the secondary transfer roller 16' of the secondary transfer device 22 meet. Accordingly, the composite toner image is transferred onto the recording medium at the secondary transfer nip in the secondary transfer device 22. After the composite toner image is transferred on the recording medium, the recording medium is transported to the fixing device 25 in which heat and pressure are applied to the recording medium bearing the unfixed toner image to fix the unfixed toner image on the recording medium.

After fixing, the recording medium is output onto a sheet output tray 57 by a sheet output roller 56. Alternatively, the direction of delivery of the recording medium is switched by a switching claw, not illustrated, thereby directing the recording medium to the sheet reversing unit 28 for duplex printing. After an image is recorded on the other side (second side) of the recording medium, the recording medium is output onto the sheet output tray 57 by the sheet output roller 56.

The intermediate transfer belt 10 after image transfer is cleaned by the belt cleaning device 17, thereby removing residual toner remaining on the intermediate transfer belt 10 after image transfer in preparation for the subsequent image forming operation.

The present inventors have recognized that when the coupling on the drive side having a rounded rectangular hole is connected to the coupling on the driven side, the contact portion of the coupling on the drive side strikes the coupling on the driven side, causing the coupling on the drive side to tilt relative to the drive shaft. In a driving force transmission unit in which the coupling includes a plurality of contact portions, when the couplings on the drive side and on the driven side are connected while the axis of the drive shaft and the axis of the driven shaft are not aligned, the coupling on the drive side tilts relative to the drive shaft. When the coupling on the drive side tilts relative to the drive shaft, the contact area of the outer circumferential surface of the drive shaft and the inner circumferential surface of the hole of the coupling on the drive side increases, thereby hindering the coupling from moving along the outer circumferential surface of the drive shaft upon connection. In this state, the coupling on the drive side may get damaged due to a force applied thereto by the coupling on the driven side.

Such damage may occur on the coupling on the driven side as well. That is, if the connecting portions of the coupling on the driven side and the rotary shaft have the same configuration as that of the drive side as described above, the contact portion of the coupling on the driven side receives force unexpectedly from the coupling on the drive side. Thus, when the coupling on the driven side tilts relative to the driven shaft, the coupling on the driven side may get damaged.

The couplings may also get damaged when separating the connected couplings away from each other. That is, when disengaging the coupling on the drive side and the coupling on the driven side while the contact portions of the coupling on the drive side and on the driven side are in contact with each other, friction between these contact portions may cause the coupling on the drive side to tilt relative to the drive shaft. With the inclined coupling on the drive side, the contact area of the outer circumferential surface of the drive shaft and the inner circumferential surface of the coupling increases and unexpected force is applied to the coupling, thereby causing damage such as breakage in the coupling. Similarly, when disengaging, the coupling on the driven side may get damaged.

In view of the above, there is unsolved need for a driving force transmission unit that does not damage couplings upon engaging and disengaging the couplings.

Next, a description is provided of a driving force transmission unit that transmits rotary driving force to respective targets in the image forming apparatus. The targets to which the rotary driving force is transmitted include, but are not limited to, the development roller of the development device, the fixing roller and the fixing belt of the fixing device 25, the photosensitive drums 40Y, 40M, 40C, and 40K, the intermediate transfer belt 10, and the conveyor belt 24. The drive targets may also include, but are not limited to, the sheet feed roller for delivering the recording medium, the conveyor roller, and the registration rollers 49. Furthermore, the driving force transmission unit of the present illustrative embodiment is suitable when the devices including the drive targets are detachably attachable relative to the image forming apparatus main body.

In the above-described image forming apparatus, the fixing device, the development device, and so forth are equipped with consumables so that the fixing device and the development device are detachably attachable relative to the main body 100 of the image forming apparatus. Such a fixing device and a development device include a rotary body (driven body) as a drive target including, but not limited to a fixing roller, a development roller, a gear, and a shaft. In order to rotate the rotary bodies in these devices, the image forming apparatus includes, for example, a drive source and a connector consisting of a gear and a joint (also called a coupling) to transmit a rotary driving force from the main body side of the image forming apparatus to these devices.

In a configuration in which the fixing device and the development device are detachably attachable relative to the main body 100 of the image forming apparatus, the installation/detachment direction of the fixing device and the development device is parallel to a rotary shaft of the rotary body. In this case, it is generally the case that a joint or a coupling with a relatively small and simple configuration is employed at the connecting portion of the driving force transmission unit. According to the present illustrative embodiment, an end of a drive shaft and an end of a driven shaft facing to the end of the drive shaft employ a coupling including a plurality of contact portions. The drive shaft and the driven shaft are coaxially disposed.

However, conventionally, if the coupling on the drive side and the driven side do not position correctly the driving shaft and the driven shaft to be connected, slight misalignment occurs in the rotation center axes of these shafts attributed to variation in tolerances of parts. When the rotation center axes (hereinafter also referred to simply as axes) are misaligned, the development device and the fixing device which are devices to be driven are vibrated. More specifically, misalignment of axes of the drive shaft and the driven shaft causes irregular contact at contact portions (claw portions) serving as the plurality of drive transmission parts of each coupling, resulting in uneven transmission of driving force at each contact portion.

When the transmission of the driving force is irregular, excess force in a certain direction acts on a plane perpendicular to the axis of the driven shaft, other than transmission of torque to the driven shaft. The direction of the excess force is not constant, but changes while rotating. As a result, vibration acts cyclically on the fixing device and the development device having the drive targets in accordance with the rotation cycle. When the development device is vibrated, a development gap fluctuates, for example, causing problems such as unevenness of image density If vibration generated at the coupling of the fixing device which requires a relatively large torque upon rotation is transmitted to the optical writing unit 21 and an optical mirror via a frame of the main body 100, image defects such as banding occur.

Furthermore, as described above, in a case in which the coupling on the drive side, which is movably biased toward the driven side along the drive shaft by a spring, does not move smoothly when connecting the couplings on the drive side and the couplings on the driven side, the coupling may get damaged. By contrast, in a case in which the coupling on the drive side includes two contact portions (claw portions) and these contact portions are pressed simultaneously from the driven side when connecting, the coupling on the drive side moves smoothly. However, if only one of the connecting portions of the coupling on the drive side is pressed from the driven side, movement of the coupling on the drive side deteriorates.

As the device such as the fixing device is mounted and removed, the contact portion of the coupling on the driven side (device side) collides repeatedly with the contact portion of the drive side moving clumsily, the coupling on the driven side may be damaged. Such damage to the couplings occurs easily when the contact portions on the drive side (main body side) and the driven side (device side) are aligned and only one of two contact portions collides. Even when the same configuration is employed at the connecting portion, the coupling having the same configuration may still get damaged easily when stiffness of a structure around the coupling on the drive side is weak and hence the coupling is easily deformed and when the positional accuracy of the coupling is difficult to obtain, hence causing easily collision of one of the contact portions. The coupling may still get damaged when the joints are easily twisted.

In view of the above, the present inventors have recognized based on experiments and studies that vibrations caused by misalignment of the axes of the drive shaft and the driven shaft upon rotation and damage to the couplings upon connection can be prevented depending on the position of the contact portions of the couplings and the position of the surfaces of the contact portions.

Figure 2:
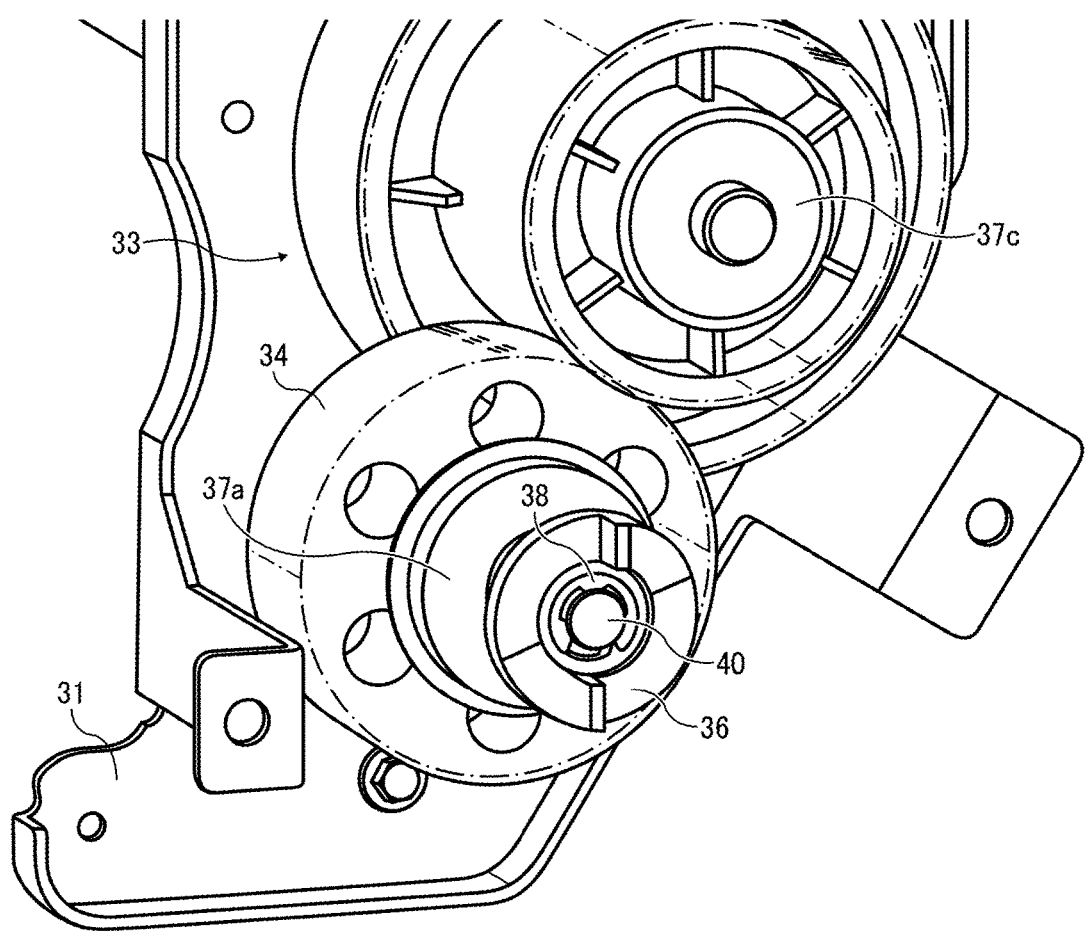
FIG. 2 is a partial perspective view schematically illustrating a driving force transmission unit employed in the image forming apparatus of FIG. 1.

FIG. 2 is a partial perspective view schematically illustrating the drive side of the driving force transmission unit employed in the image forming apparatus of FIG. 1 according to an illustrative embodiment of the present disclosure.

Figure 3A:
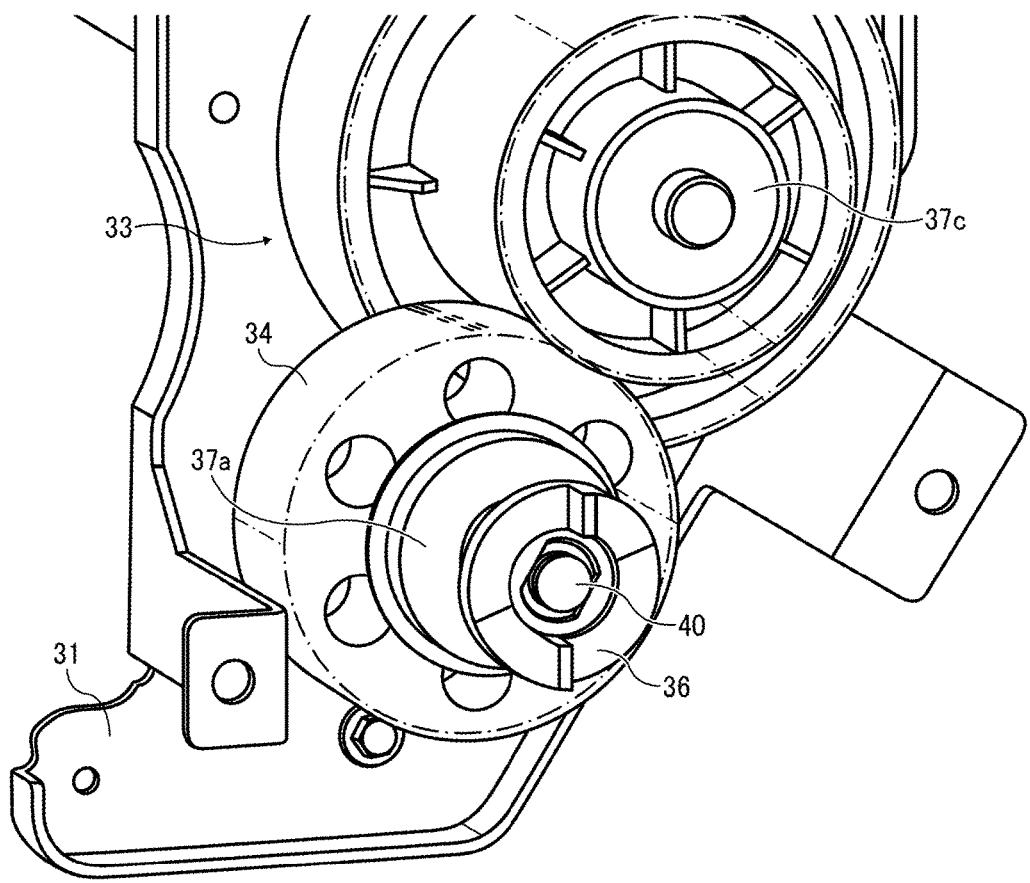
FIG. 3A is a partial perspective view schematically illustrating the driving force transmission unit of FIG. 2 without an E-ring.
Figure 3B:
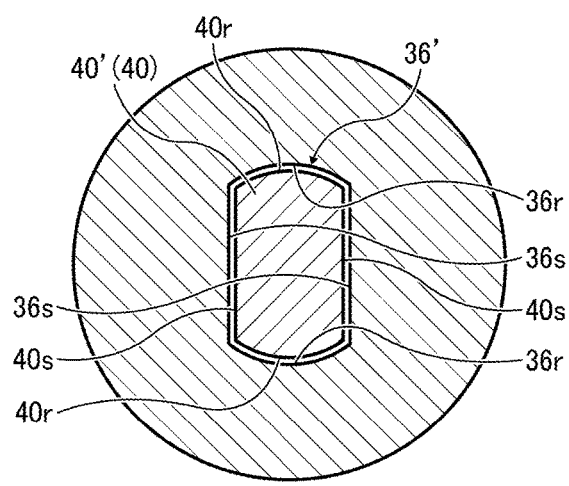
FIG. 3B is an enlarged cross-sectional view schematically illustrating a drive shaft and a drive joint on a drive side employed in the driving force transmission unit.

FIG. 3A is a partial perspective view schematically illustrating the driving force transmission unit without an E-ring 38. FIG. 3B is an enlarged cross-sectional view schematically illustrating a drive shaft 40 and a drive joint 36 on the drive side employed in the driving force transmission unit.

As illustrated in FIG. 2, a drive gear 34 is mounted coaxially on the same axis as the drive shaft 40 serving as a rotary shaft on the drive side. Rotary driving force received by the drive gear 34 is transmitted to a drive joint 36 as a drive-side coupling (first coupling) supported integrally by the end portion the drive shaft 40 on the driven side. The drive joint 36 is movable in a direction of thrust of the drive shaft 40 and biased towards the driven side (towards the right front side in FIG. 2) by a biasing member, for example, a spring.

The E-ring 38 as a stopper positions the drive joint 36 at the end portion of the drive shaft 40 on the driven side and prevents the drive joint 36 from slipping off from the front side of the drive shaft 40 in the thrust direction. That is, the E-ring 38 also serves as a stopper to prevent the drive joint 36 from falling.

The driving force transmission unit of the present illustrative embodiment includes parts supported by a bracket 31 serving as a support member and a motor serving as a drive source of the rotary driving force. The rotary driving force produced by the motor is transmitted from a motor gear as an output shaft of the motor, via an idler gear 33, to the drive gear 34 and the drive shaft 40 fixed to the drive gear 34 via a bearing 37a. The idler gear 33 includes a large-diameter idler gear and a small-diameter idler gear disposed coaxially, and is attached to a rotary shaft via a bearing 37c. The motor gear meshes with the large-diameter idler gear. The drive gear 34 meshes with the small-diameter idler gear of the idler gear 33.

The drive gear 34 and the drive shaft 40 are supported on the main body side of the image forming apparatus via the bearing 37a. The drive joint 36 is attached to an end portion of the rotary shaft of the drive shaft 40. The spring that biases the drive joint 36 is mounted between the bearing 37a and the drive joint 36 in a compressed state.

The drive joint 36 is connected to a driven joint (a second coupling, i.e., a driven joint 136 shown in FIG. 14) attached to the end of a rotary shaft connected to a drive-target rotary body on the driven side. The drive joint 36 and the driven joint 136 constitute a connecting portion (coupling) to transmit a driving force. Upon transmission of the rotary driving force from the drive joint 36 to the driven joint 136, at least one of two projections, i.e., drive claws 39a and 39b (shown in FIG. 4) disposed on the drive joint 36 contacts one of two driven claws of the driven joint 136, thereby transmitting the driving force to the driven joint. Accordingly, the rotary driving force is transmitted from the drive joint 36 to the driven joint 136. More specifically, the drive joint 36 and the driven joint constitute a connecting portion at which the rotary driving force of the drive joint 36 is transmitted to the driven joint 136.

As illustrated in FIG. 3A, the drive joint 36 includes a hole 36' in the center thereof for connection. The drive shaft 40 is inserted through the hole 36' to fit with the drive joint 36. The hole 36' is a through hole extending along the rotation center axis of the drive shaft 40. The hole 36' has a rounded rectangular shape in cross section orthogonal to the rotation center axis of the drive shaft 40. The hole 36' includes a pair of circular arc portions (circumferential surface portion) 36r having a circular-arc shape in cross section, and a pair of linear portions (flat portion) 36s parallel to each other. Here, "cross section" refers to a cross section orthogonal to the rotation center axis of the drive shaft 40.

The drive shaft 40 includes a shaft portion (also referred to as a "connecting shaft portion") 40' having a rounded rectangular shape in cross section to connect to the drive joint 36. The shaft portion 40' is fitted into the hole 36' of the drive joint 36 with some clearance so that the drive joint 36 can move along the drive shaft 40. The shaft portion 40' includes a pair of circular arc portions (circumferential surface portion) 40r having a circular-arc shape in cross section, and a pair of linear portions (flat portion) 40s parallel to each other. The axis of the drive shaft 40 and the axis of the drive joint 36 are aligned at the circumferential surface portions facing each other. The rotary driving force is transmitted from the drive shaft 40 to the drive joint 36 at the linear portions facing each other.

Here, the rounded rectangular shape refers to a rectangle or a square, the corners of which are rounded. The rounded rectangular shape includes a first shape having one of the pairs of opposite sides is not parallel, but has a circular arc shape, and a second shape having a circular arc shape independently at four corners of the rectangle or the square. The rounded rectangular shape also includes a third shape in which one of four sides is linear and other three sides have a circular arc shape integrally. In other words, the third shape consists of one linear side and one circular arc shape portion, which may look like a D-shape. The rounded rectangular shape also includes a fourth shape in which one of four sides of the rectangle or the square has a circular arc shape.

A description is provided of a case in which the rounded rectangular shape of the shaft portion 40' and the hole 36' in cross section has the above-described first shape. However, the shape is not limited to the first shape, but the second, third, and fourth shapes may also be applicable.

Figure 4:
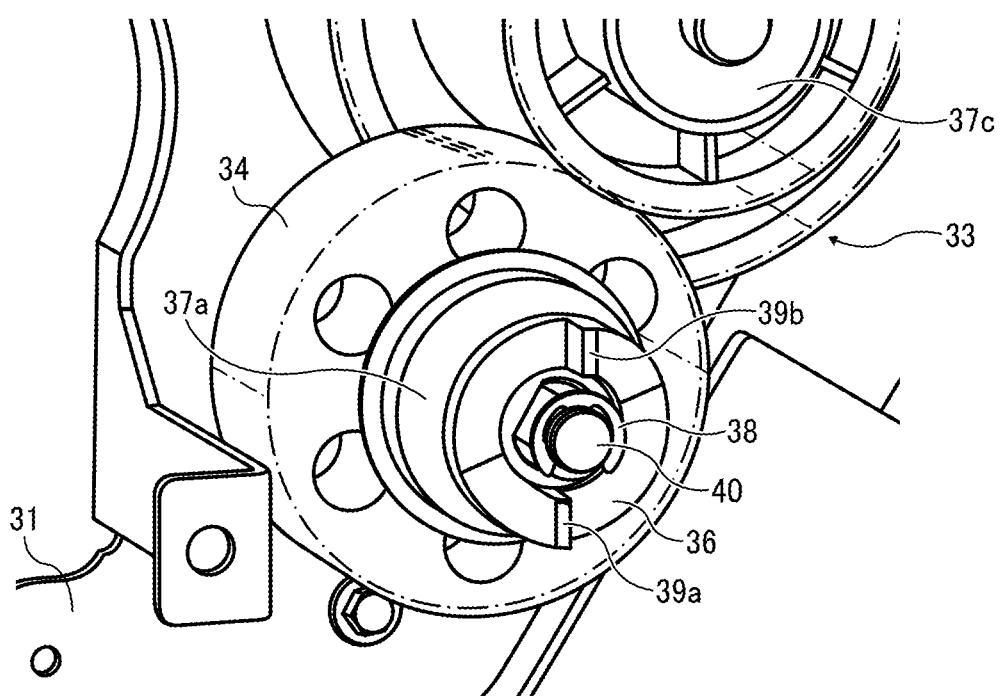
FIG. 4 is a partially enlarged perspective view schematically illustrating the drive joint and a surrounding structure according to an illustrative embodiment of the present disclosure.

FIG. 4 is a partially enlarged perspective view schematically illustrating the drive joint 36 and a surrounding structure according to an illustrative embodiment of the present disclosure.

Figure 5:
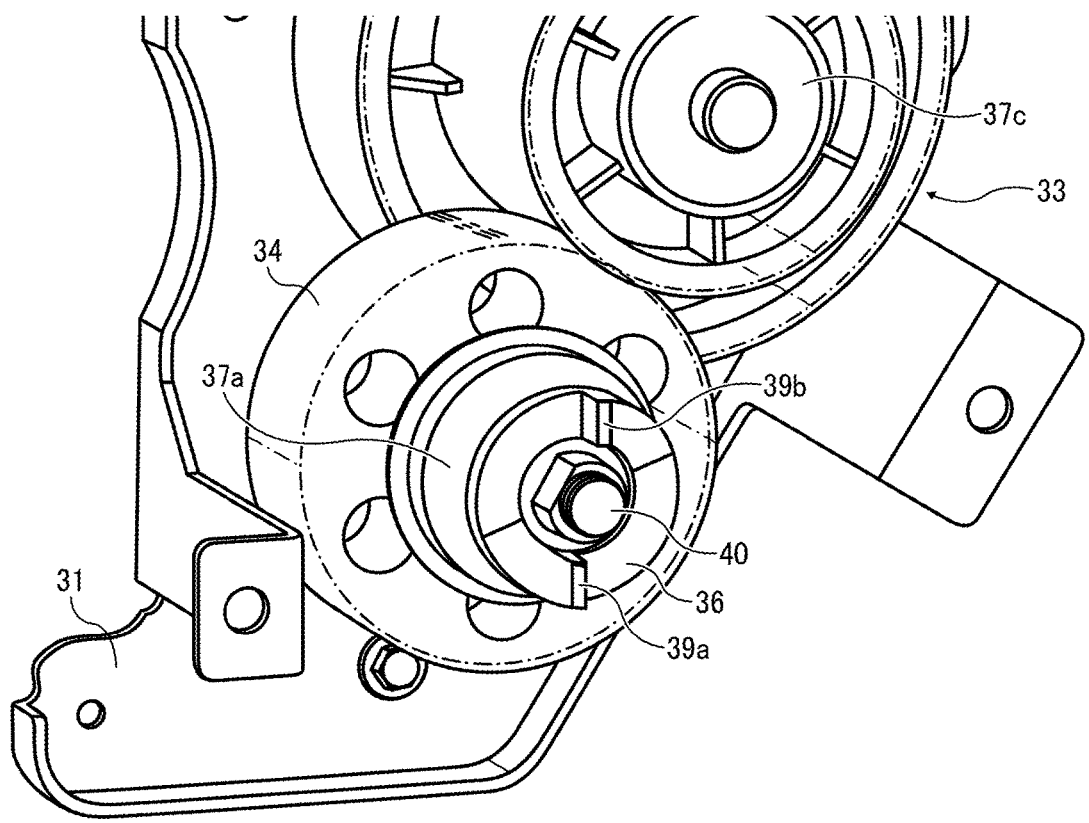
FIG. 5 is a partial perspective view schematically illustrating the driving force transmission unit of FIG. 4 without the E-ring.

FIG. 5 is a partial perspective view schematically illustrating the driving force transmission unit of FIG. 4 without the E-ring.

Figure 6:
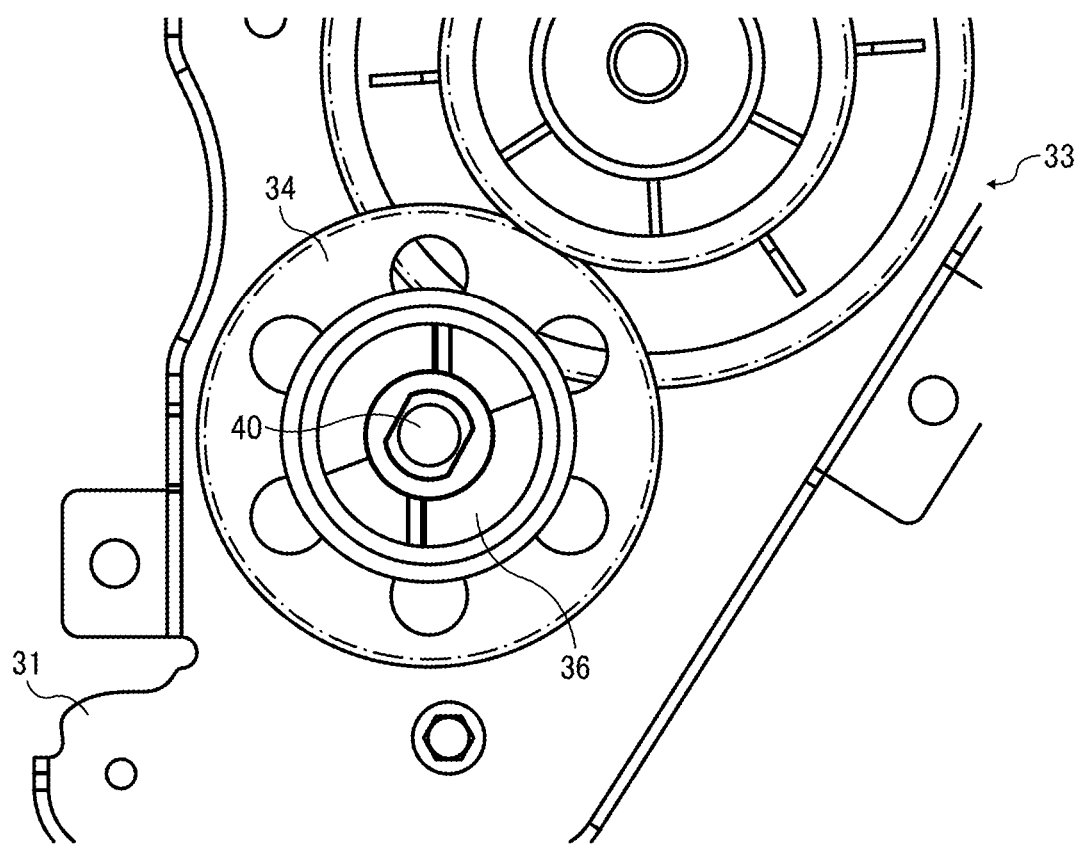
FIG. 6 is a partially enlarged front view schematically illustrating a structure around the drive shaft in the driving force transmission unit according to an illustrative embodiment of the present disclosure.

FIG. 6 is a partially enlarged front view schematically illustrating a structure around the drive shaft 40.

The drive joint 36 includes the drive claws 39a and 39b as contact portions disposed at the end of the drive joint 36 on the driven side. The drive claws 39a and 39b project towards the driven side. As described above, the drive joint 36 is biased towards the driven side (towards the right front side in FIG. 4) by the spring. The drive joint 36 moves towards the drive gear 34 along the drive shaft 40 when a force in a direction towards the drive gear 34 along the center axis of the drive shaft 40 is applied to the drive claws 39a and 39b.

As described above, the fitting portions of the drive shaft 40 and the drive joint 36 have the rounded, rectangular-shaped shaft portion 40' and the hole 36', respectively. The axis of the drive joint 36 relative to the axis of the drive shaft 40 is aligned by the circular arc portion 40r of the shaft portion 40' and the circular arc portion 36r of the hole 36'. The rotary driving force is transmitted from the drive shaft 40 to the drive joint 36 at the linear portion 40s of the shaft portion 40' and the linear portion 36s of the hole 36'.

As will be described later in detail, the end of the drive joint 36 on the driven side includes the drive claws 39a and 39b at positions corresponding to the circular arc portion 36r of the hole 36'. With this configuration, when the force in the direction of thrust acting on the drive claws 39a and 39b causes the drive joint 36 to tilt relative to the drive shaft 40, the inner circumferential surface of the hole 36' of the drive joint 36 and the outer circumferential surface of the shaft portion 49' of the drive shaft 40 contact in the following manner. That is, the circular arc portion 36r of the hole 36' of the drive joint 36 makes a point contact with the circular arc portion 40r of the shaft portion 40' of the drive shaft 40.

FIG. 7A is a partial front view schematically illustrating the structure around the drive shaft 40 of the driving force transmission unit according to an illustrative embodiment of the present disclosure. FIG. 7B is a cross-sectional view schematically illustrating the drive shaft 40 and the center axis thereof as viewed along a line G-G in FIG. 7A.

FIG. 8A is a front view schematically illustrating the drive shaft 40 and the drive joint 36 of the driving force transmission unit according to an illustrative embodiment of the present disclosure. FIG. 8B is a cross-sectional view schematically illustrating the drive shaft 40 and the center axis thereof as viewed along a line J-J in FIG. 8A. FIG. 8C is a cross-sectional view schematically illustrating the drive shaft 40 and the center axis thereof as viewed along a line K-K in FIG. 8A.

As illustrated in FIG. 8C, when external forces 87a and 87b in the direction of thrust along the center axis of the drive shaft 40 act on the drive joint 36, the drive joint 36 slides along the direction of the external forces 87a and 87b.

Figure 9:
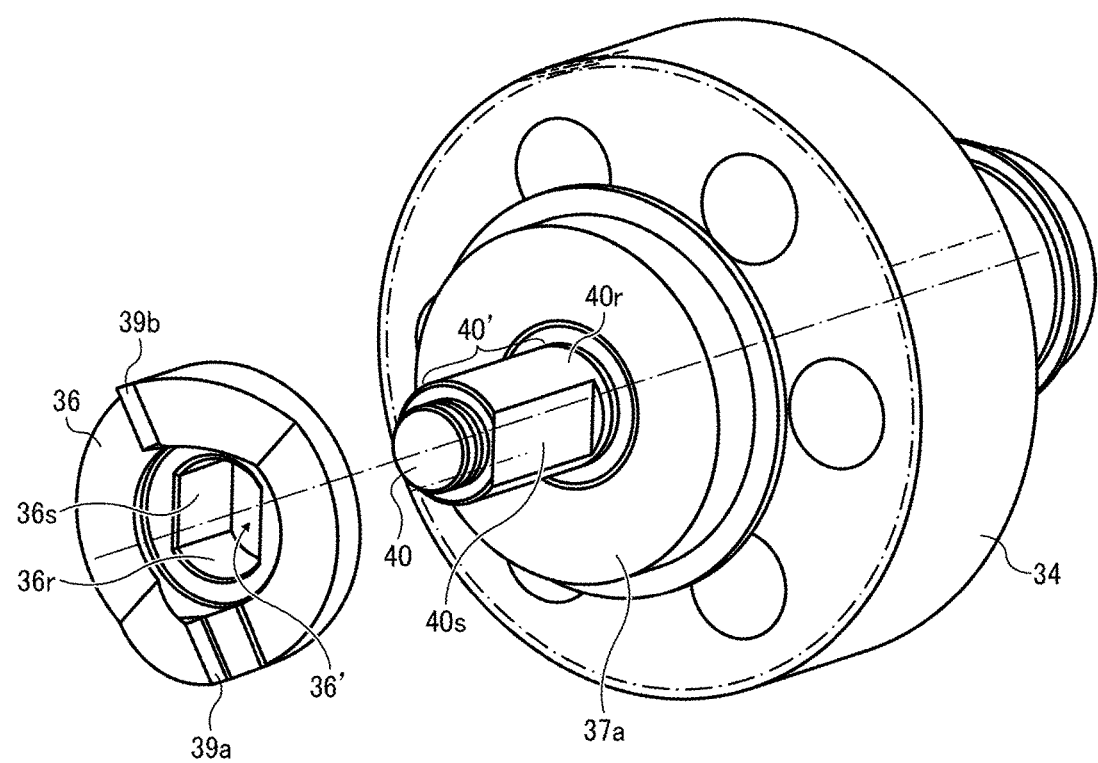
FIG. 9 is an exploded perspective view schematically illustrating the drive joint and the structure around the drive shaft in the driving force transmission unit according to an illustrative embodiment of the present disclosure.

FIG. 9 is an exploded perspective view schematically illustrating the structure around the drive joint 36 and the drive shaft 40.

In FIG. 9, the outer circumferential surface of the shaft portion 40' having the rounded rectangular shape includes the circular arc portion 40r having a circular-arc shape in cross section, and the linear portion 40s having a linear shape in cross section. The hole 36' of the drive joint 36 includes the circular arc portion 36r having a circular-arc shape in cross section and the linear portion 36s having a linear shape in cross section. As described above, the circular arc portion 40r of the drive shaft 40 contacts the circular arc portion 36r of the drive joint 36, and the linear portion 40s of the drive shaft 40 contacts the linear portion 36s of the drive joint 36.

The external forces acting on the drive claws 39a and 39b of the drive joint 36 may cause the drive joint 36 to tilt relative to the drive shaft 40 within the clearance between the drive joint 36 and the drive shaft 40 fitted into the drive joint 36. In this case, the circular arc portion 36r of the drive joint 36 makes a point contact with the circular arc portion 40r of the drive shaft 40. The position of the point contact depends on the size, the position, and the direction of the thrust force acting on the drive claws 39a and 39b.

Figure 10:
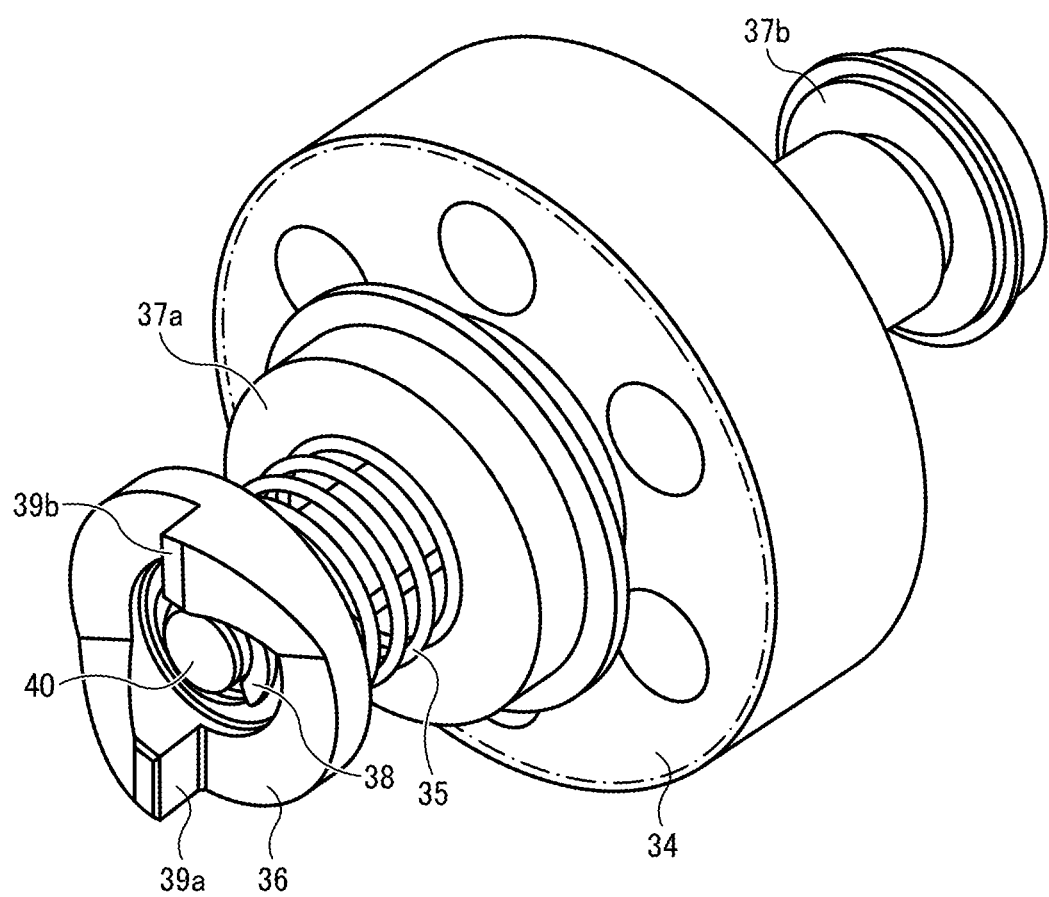
FIG. 10 is a perspective view schematically illustrating the drive joint and the structure around the drive shaft in a state in which the drive joint is mounted in the driving force transmission unit according to an illustrative embodiment of the present disclosure.
Figure 11:
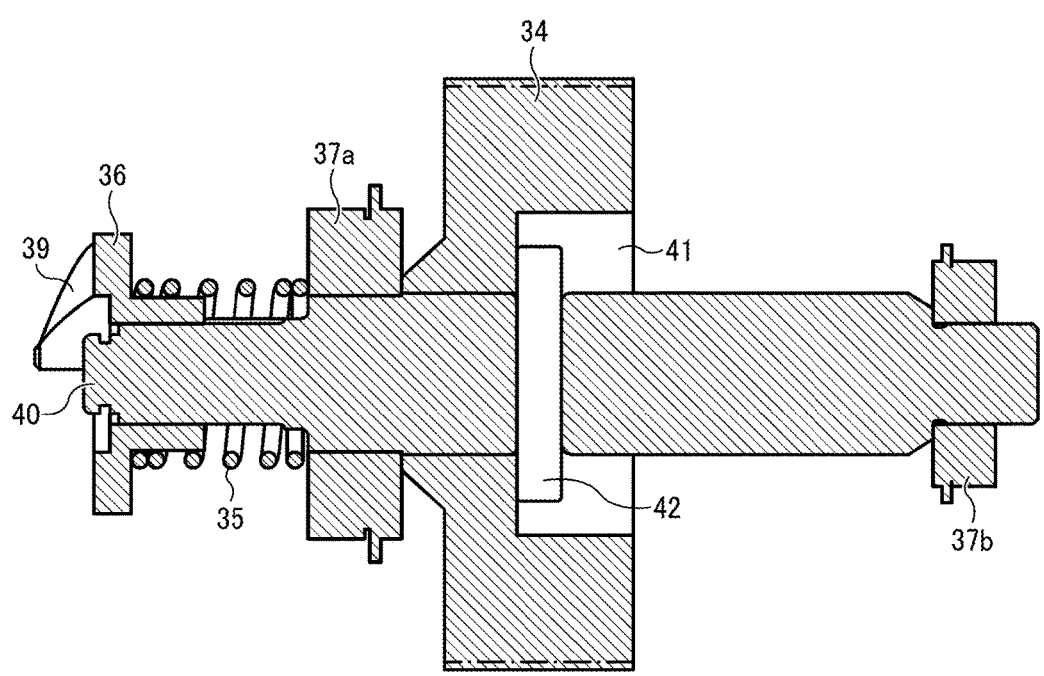
FIG. 11 is a cross-sectional view schematically illustrating the structure around the drive shaft in a state in which the drive joint is mounted in the driving force transmission unit according to an illustrative embodiment of the present disclosure.

FIG. 10 is a perspective view schematically illustrating the structure around the drive shaft 40 in a state in which the drive joint 36 is mounted. FIG. 11 is a cross-sectional view of FIG. 10. It is to be noted that a spring 35 is shown in FIGS. 10 and 11.

In FIGS. 10 and 11, the spring 35 is mounted between the bearing 37a and the drive joint 36 in a compressed state. In a case in which the leading end of the driven joint 136 as a coupling on the driven side contacts the drive claws 39a and 39b of the drive joint 36 and the external force from the driven joint side causes the drive joint 36 to move towards the drive gear 34 along the center axis of the drive shaft 40, the spring 35 generates a reaction force against the external force from the driven joint side and pushes the drive joint 36 back to the drive joint side.

Figure 12:
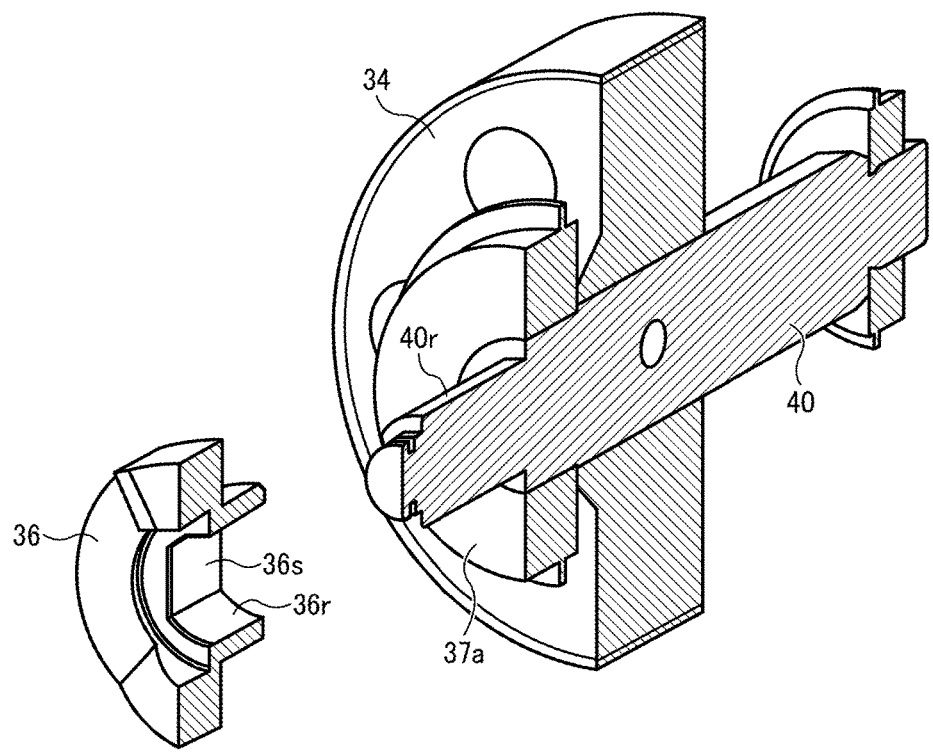
FIG. 12 is a horizontal cross-sectional view schematically illustrating the drive joint and the structure around the drive shaft in the driving force transmission unit according to an illustrative embodiment of the present disclosure.
Figure 13:
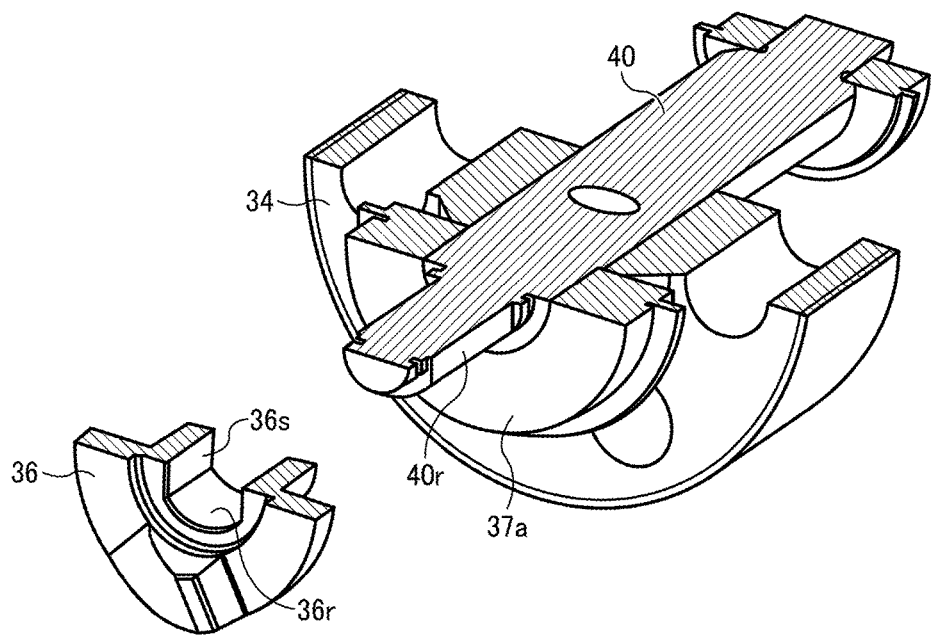
FIG. 13 is a vertical cross-sectional view schematically illustrating the drive joint and the structure around the drive shaft in the driving force transmission unit according to an illustrative embodiment of the present disclosure.

FIG. 12 is a horizontal cross-sectional view schematically illustrating the drive joint 36 and the structure around the drive shaft 40. FIG. 13 is a vertical cross-sectional view illustrating the drive joint 36 and the structure around the drive shaft 40.

The circular arc portion 40r of the drive shaft 40 contacts the circular arc portion 36r of the drive joint 36. The linear portion 40s of the drive shaft 40 contacts the linear portion 36s of the drive joint 36. The external forces acting on the drive claws 39a and 39b of the drive joint 36 may cause the drive joint 36 to tilt within the clearance between the drive joint 36 and the drive shaft 40 fitted into the drive joint 36. In this case, the circular arc portion 36r of the drive joint 36 makes a point contact with the circular arc portion 40r of the drive shaft 40. The position of the point contact depends on the size, the position, and the direction of the thrust force acting on the drive claws 39a and 39b.

Figure 14:
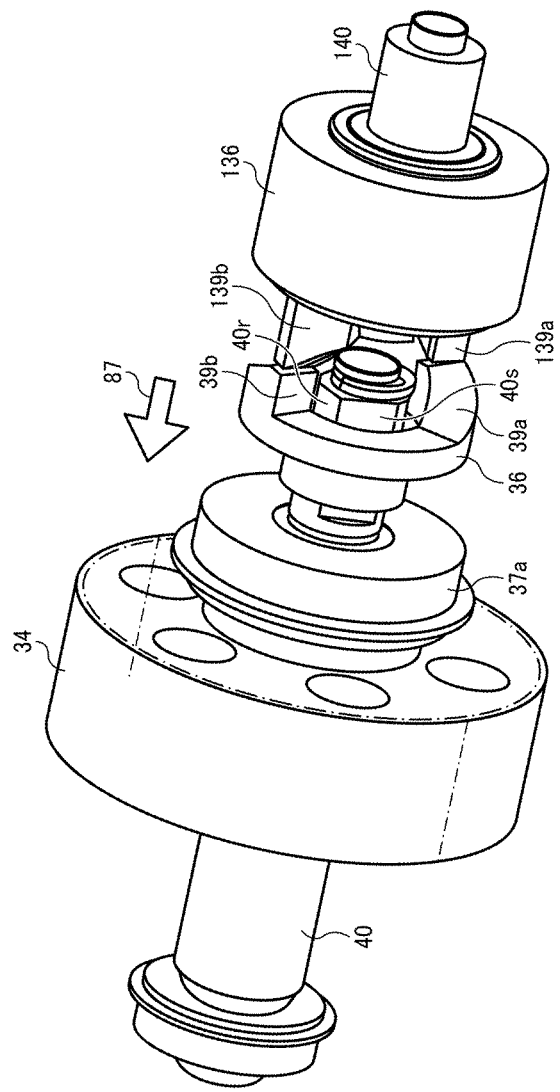
FIG. 14 is a perspective view schematically illustrating a driven joint being connected to the drive joint in the driving force transmission unit according to an illustrative embodiment of the present disclosure.
Figure 15:
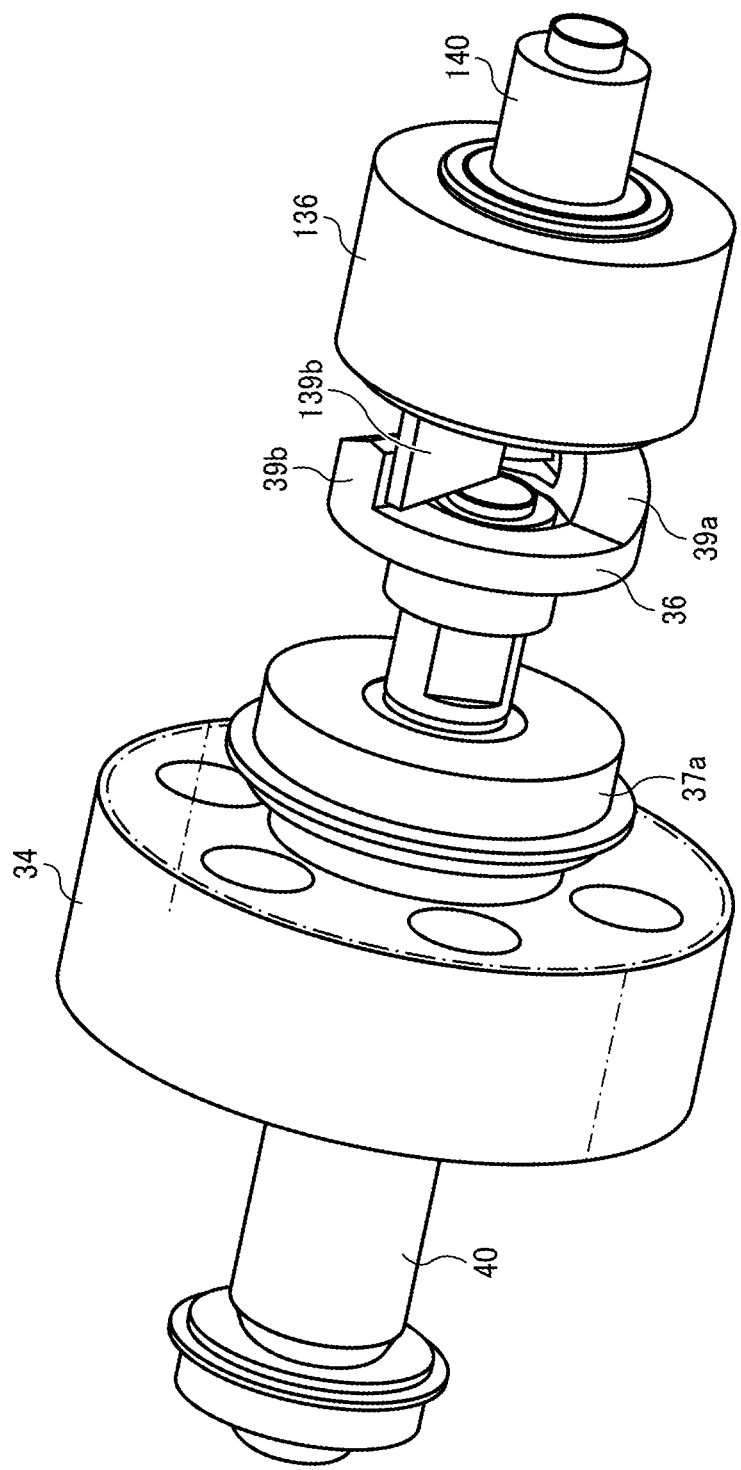
FIG. 15 is a perspective view schematically illustrating the drive joint and the driven joint in an engaged state in the driving force transmission unit according to an illustrative embodiment of the present disclosure.

FIGS. 14 and 15 illustrate the drive joint 36 and the stricture around the drive shaft 40 of the driving force transmission unit according to the illustrative embodiment of the present disclosure. FIG. 14 is a perspective view schematically illustrating the driven joint 136 being connected to the drive joint 36. FIG. 15 is a perspective view schematically illustrating the drive joint 36 and the driven joint 136 in an engaged state.

As illustrated in FIG. 14, the driven joint 136 includes driven claws 139a and 139b as contact portions that contact the drive claws 39a and 39b of the drive joint 36. The phase in the rotational direction of the driven joint 136 relative to the drive joint 36 is made such that the leading end of the driven claws 139a and 139b contact the leading end of the drive claws 39a and 39b of the drive joint 36. When the leading ends of the claws of the drive joint 36 and the driven joint 136 come into contact, the drive joint 36 moves in a direction 87 indicated by a hollow arrow (hereinafter referred to as a thrust gear direction) towards the drive gear 34 against the reaction force of the spring 35.

FIG. 15 illustrates the driven claws 139a and 139b of the driven joint 136 meshing with the drive claws 39a and 39b of the drive joint 36 to transmit rotary driving force. The reaction force of the spring 35 causes the drive joint 36 to move in the direction opposite to the thrust gear direction 87 and contact the E-ring 38.

Figure 16:
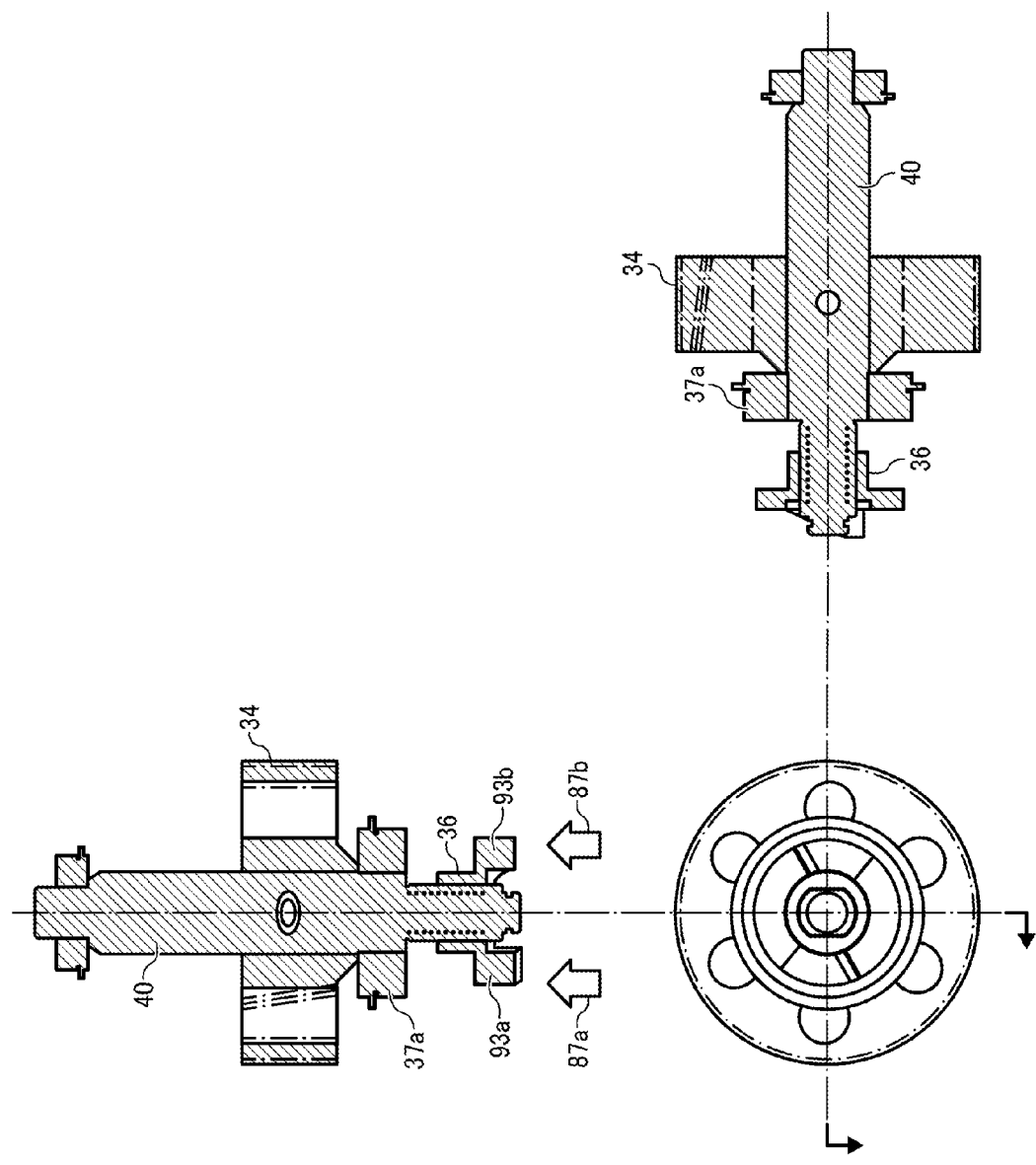
FIG. 16 illustrates a structure around an output shaft of a drive device of a comparative example of the driving force transmission unit.

FIG. 16 illustrates a structure around an output shaft of a drive device of a comparative example of the driving force transmission unit.

In the comparative example shown in FIG. 16, when the external forces 87a and 87b act on the drive joint 36, the drive joint 36 slides in the direction of the external forces. Drive claws 93a and 93b are disposed outside the linear portion 40s of the drive shaft 40 in the radial direction. In the comparative example, when the thrust force acts on the drive claws 93a and 93b, causing the drive joint 36 to tilt relative to the drive shaft 40, the circular arc portion 36r of the drive joint 36 and the linear portion 40s of the drive shaft 40 come into contact. The external forces acting on the drive claws 93a and 93b may cause the drive joint 36 to tilt within the clearance between the drive joint 36 and the drive shaft 40 fitted into the drive joint 36. In this case, the linear portion 36s of the drive joint 36 and the linear portion 40s of the drive shaft 40 make a line contact (contact line). The size of force applied to the contact line and the distribution of the force depend on the size, the position, and the direction of the thrust force acting on the drive claws 39a and 39b.

Figure 17:
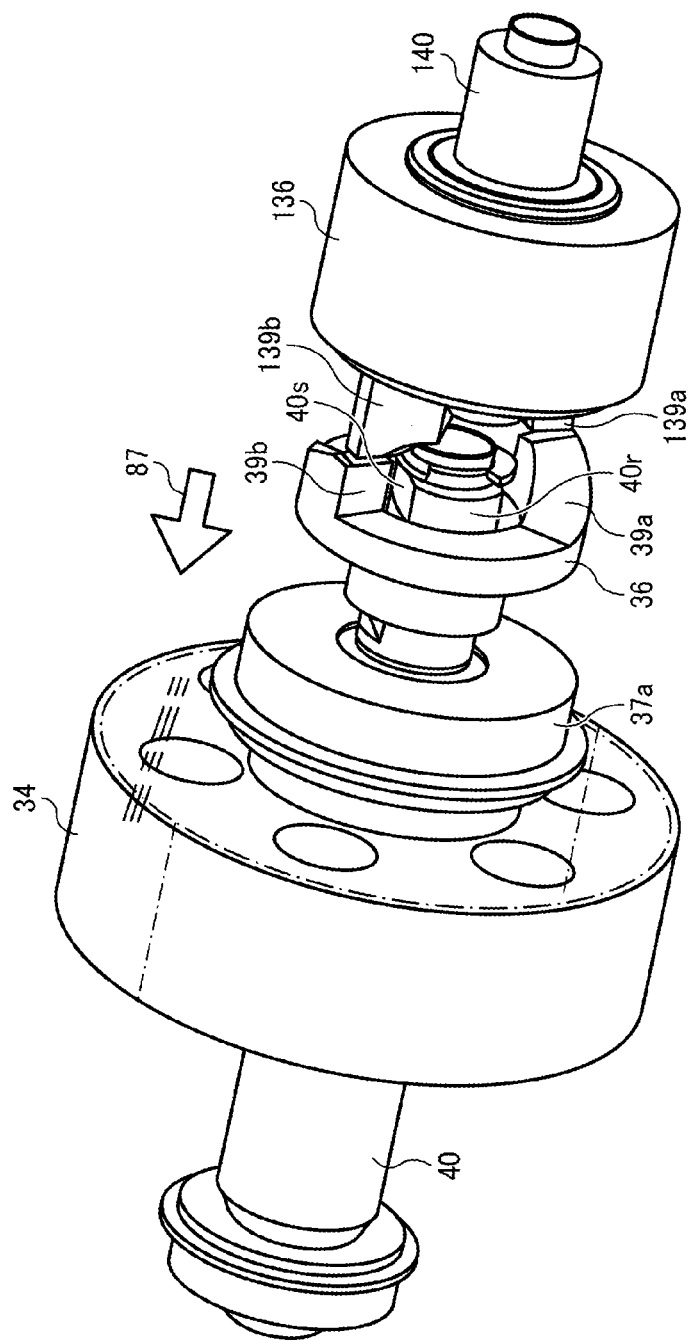
FIG. 17 is a perspective view schematically illustrating the structure around the output shaft of the drive device of the comparative example of the driving force transmission unit.

FIG. 17 is a perspective view schematically illustrating the structure around the output shaft of the drive device of the comparative example of the driving force transmission unit.

As illustrated in FIG. 17, the phase in the rotational direction of the driven joint 136 relative to the drive joint 36 is made such that the leading end of the driven claws 139a and 139b of the driven joint 136 contact the leading end of the drive claws 39a and 39b of the drive joint 36, respectively. When the leading ends of the claws of the drive joint 36 and the driven joint 136 come into contact, the drive joint 36 moves in the thrust gear direction 87 against the reaction force of the spring 35. It is to be noted that in FIG. 17 the relationship between the linear portion 40s of the drive shaft 40 and the linear portion 36s of the drive joint 36, and the relationship between the circular arc portion 40r of the drive shaft 40 and the circular arc portion 36r of the drive joint 36 are different by 90 degrees as compared with the illustrative embodiment shown in FIG. 14. For this reason, a contact resistance of the drive shaft 40 and the drive joint 36 when the drive joint 36 moves in the thrust gear direction 87 is greater than that shown FIG. 14 Furthermore, an edge of the outer peripheral surface of the hole 36' of the drive joint 36 engages the linear portion 40s of the drive shaft 40 undesirably, thereby hindering the drive joint 36 from returning to the E-ring 38. When the drive joint 36 fails to return to the E-ring 38, the rotary driving force is not transmitted to the driven side.

Figure 18:
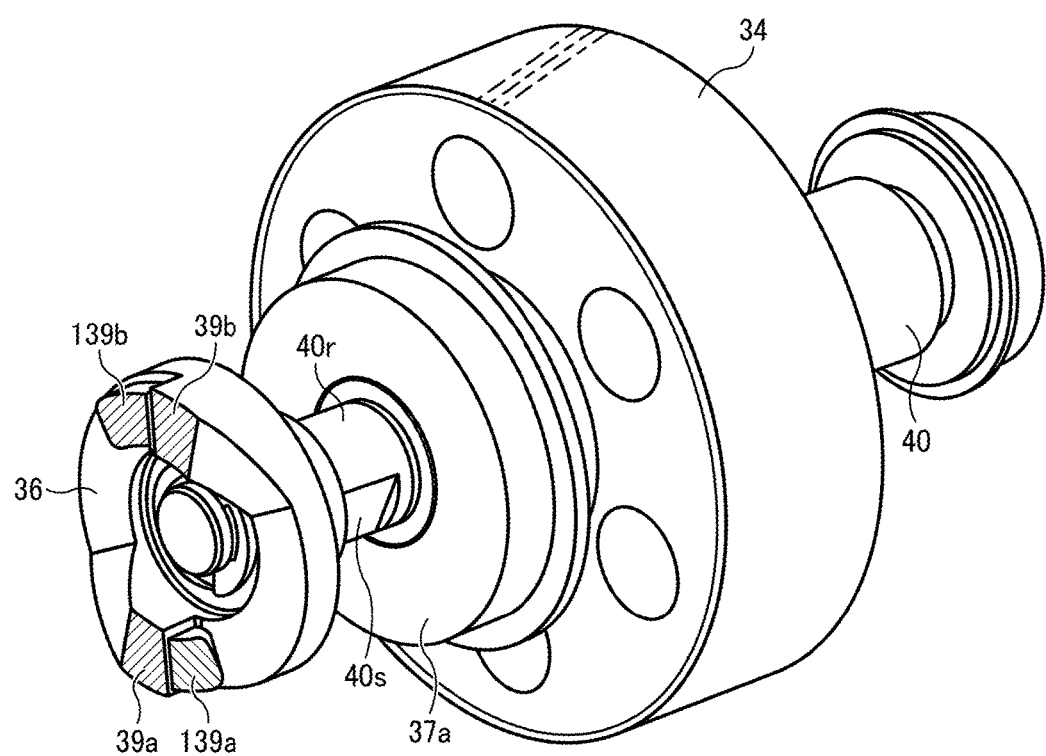
FIG. 18 is a partially enlarged perspective view schematically illustrating a connecting portion of the drive joint and the driven joint according to an illustrative embodiment of the present disclosure.
Figure 19:
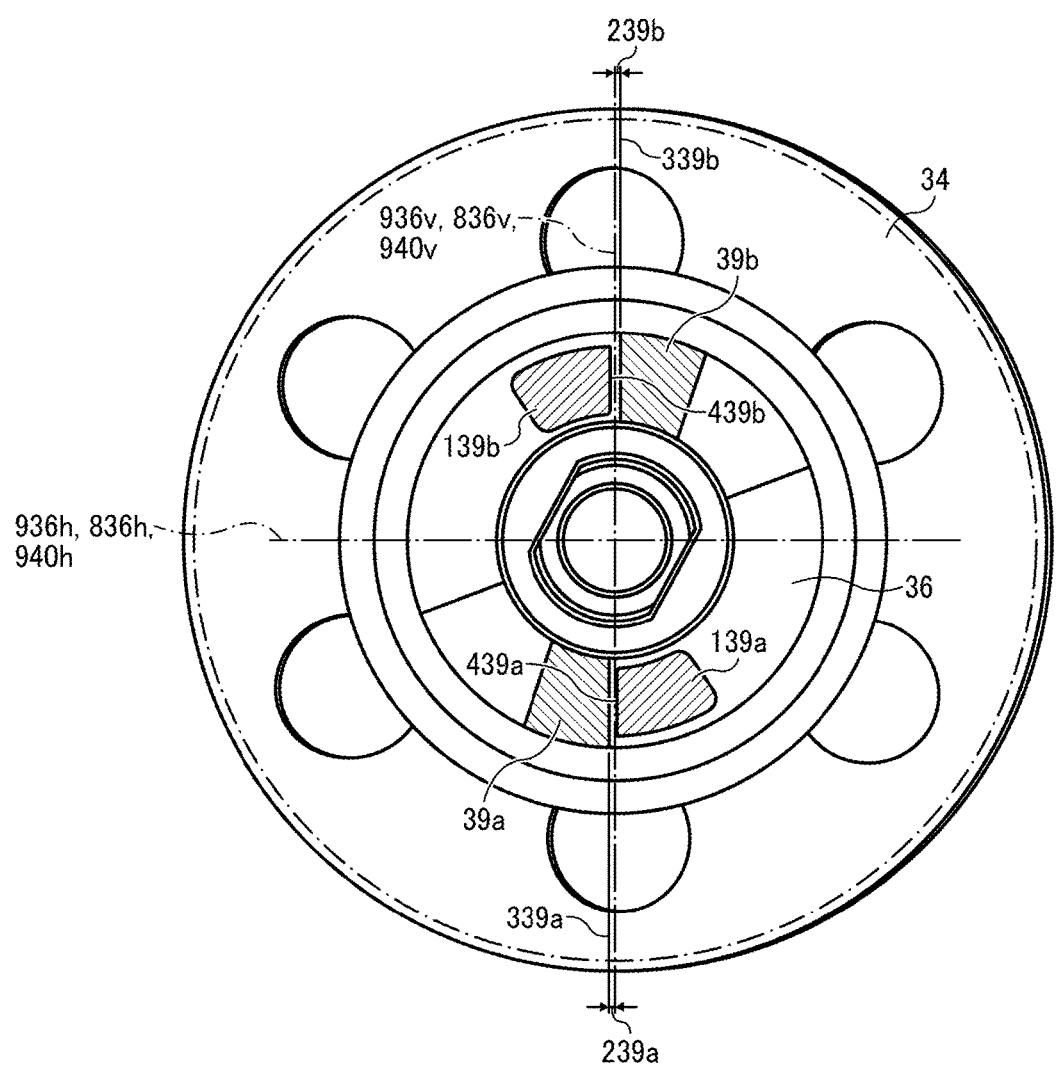
FIG. 19 is a partially enlarged cross-sectional view schematically illustrating a connecting portion at which the drive joint and the driven joint are connected according to an illustrative embodiment of the present disclosure.

FIG. 18 is a partially enlarged perspective view schematically illustrating a connecting portion at which the drive joint 36 and the driven joint 136 are connected according to an illustrative embodiment of the present disclosure. FIG. 19 is a cross-sectional view cut along a plane perpendicular to the drive shaft 40 in a state in which the drive joint 36 and the driven joint 136 are engaged ideally (engaged state).

In FIGS. 18 and 19, in a state in which the rotary driving force is not transmitted from the drive side to the driven side, gaps 239a and 239b (claw displacement amount) are provided between the drive claws 39a and 39b of the drive joint 36, and the driven claws 139a and 139b of the driven joint 136.

Each part shown in FIG. 19 is defined as follows.

As imaginary planes including the center axis of the drive joint 36, a horizontal drive-joint center plane 836h and a vertical drive-joint center plane 836v are defined as follows. The horizontal drive-joint center plane 836h is an imaginary plane that includes the center axis of the drive joint 36 and extends horizontally (left-right direction in FIG. 19). The vertical drive-joint center plane 836v is an imaginary plane that includes the center axis of the drive joint 36 and extends vertically (up-down direction in FIG. 19) perpendicular to the horizontal drive-joint center plane 836h.

Furthermore, as imaginary planes including the center axis of the driven joint 136, a horizontal driven-joint center plane 936h and a vertical driven-joint center plane 936v are defined as follows. The horizontal driven-joint center plane 936h is an imaginary plane that includes the center axis of the driven joint 136 and extends horizontally (left-right direction in FIG. 19). The vertical driven-joint center plane 936v is an imaginary plane that includes the center axis of the driven joint 136 and extends vertically (up-down direction in FIG. 19) perpendicular to the horizontal driven-joint center plane 936h.

As imaginary planes including the center axis of the drive shaft 40, a horizontal drive-shaft center plane 940h and a vertical drive-shaft center plane 940v are defined as follows. The horizontal drive-shaft center plane 940h is an imaginary plane that includes the center axis of the drive shaft 40 and extends horizontally (left-right direction in FIG. 19). The vertical drive-shaft center plane 940v is an imaginary plane that includes the center axis of the drive shaft 40 and extends vertically (up-down direction in FIG. 19) perpendicular to the horizontal drive-shaft center plane 940h.

Contact surfaces of the drive claws 39a and 39b of the drive joint 36 that contact the driven side include drive-side joint contact surfaces 339a and 339b as first contact portions.

Contact surfaces of the driven claws 139a and 139b of the driven joint 136 that contact the drive side include driven-side joint contact surfaces 439a and 439b as second contact portions.

In FIG. 19, the drive-side joint contact surfaces 339a and 339b are displaced by an amount of the gaps (claw displacement amount) 239a and 239b from the vertical drive-joint center plane 836v, the vertical driven-joint center plane 936v, and the vertical drive-shaft center plane 940v. Preferably, the absolute value of the gaps (claw displacement amount) 239a and 239b is equal to or greater than an amount of displacement between the rotation center axes of the drive shaft 40 and a driven shaft 140 as a rotary shaft on the driven side. With this configuration, a force in the radial direction is not applied from the drive shaft side to the driven shaft side.

Figure 20:
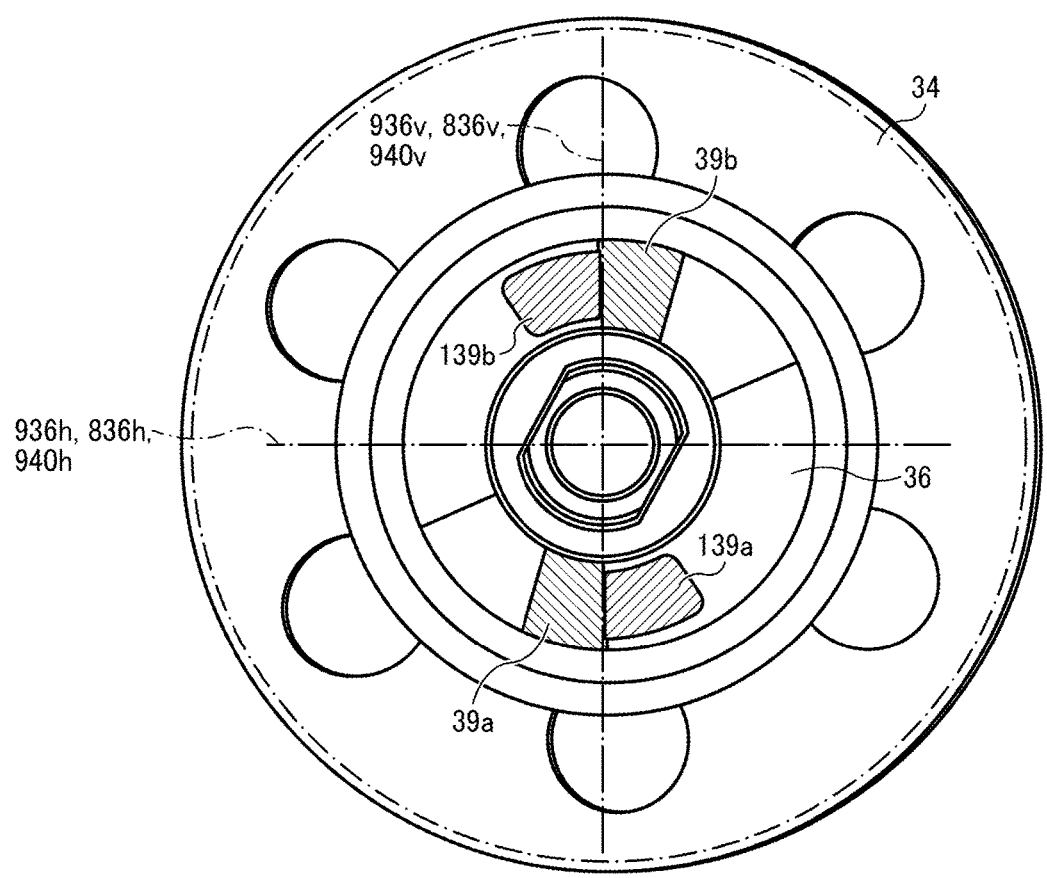
FIG. 20 is a partially enlarged cross-sectional view schematically illustrating the connecting portion at which the drive joint and the driven joint are fitted during rotation according to an illustrative embodiment of the present disclosure.

FIG. 20 is a partially enlarged cross-sectional view schematically illustrating the connecting portion of the drive joint 36 and the driven joint 136 fitted thereto during rotation according to an illustrative embodiment of the present disclosure.

Figure 21:
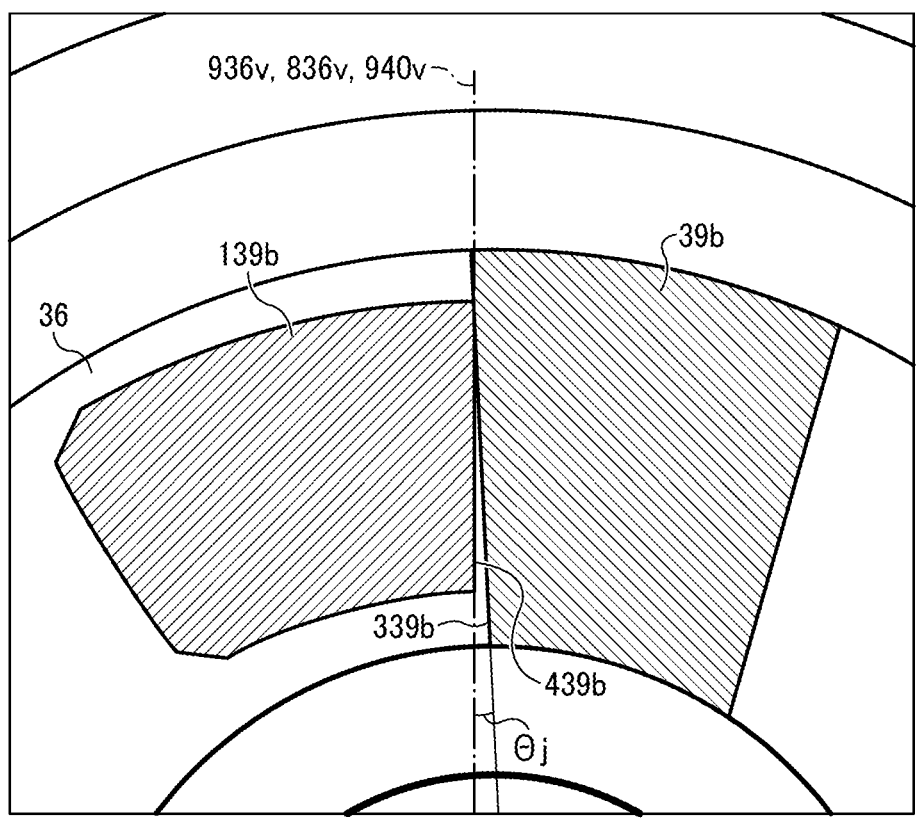
FIG. 21 is a partially enlarged front view schematically illustrating a contact portion at which a drive claw portion of the drive joint of FIG. 20 and a driven claw portion of the driven joint are in contact.

FIG. 21 is a partially enlarged cross-sectional view schematically illustrating the contact portion of the drive claw 39b of the drive joint 36 and the driven claw 139b of the driven joint 136 of FIG. 20.

FIGS. 20 and 21 show the drive joint 36 and the driven joint 136 which have been rotated about the drive shaft 40 until the drive joint 36 and the driven joint 136 come into contact.

As illustrated in FIG. 21, the drive-side joint contact surface 339b of the drive claw 39b of the drive joint 36 makes a point contact with the driven-side joint contact surface 439b of the driven claw 139b of the driven joint 136 with an angle θj therebetween upon contact. The rotary driving force on the drive side is transmitted to the driven joint 136 at the point-contact portion with the rotation center of the drive shaft 40 as the origin.

Figure 23:
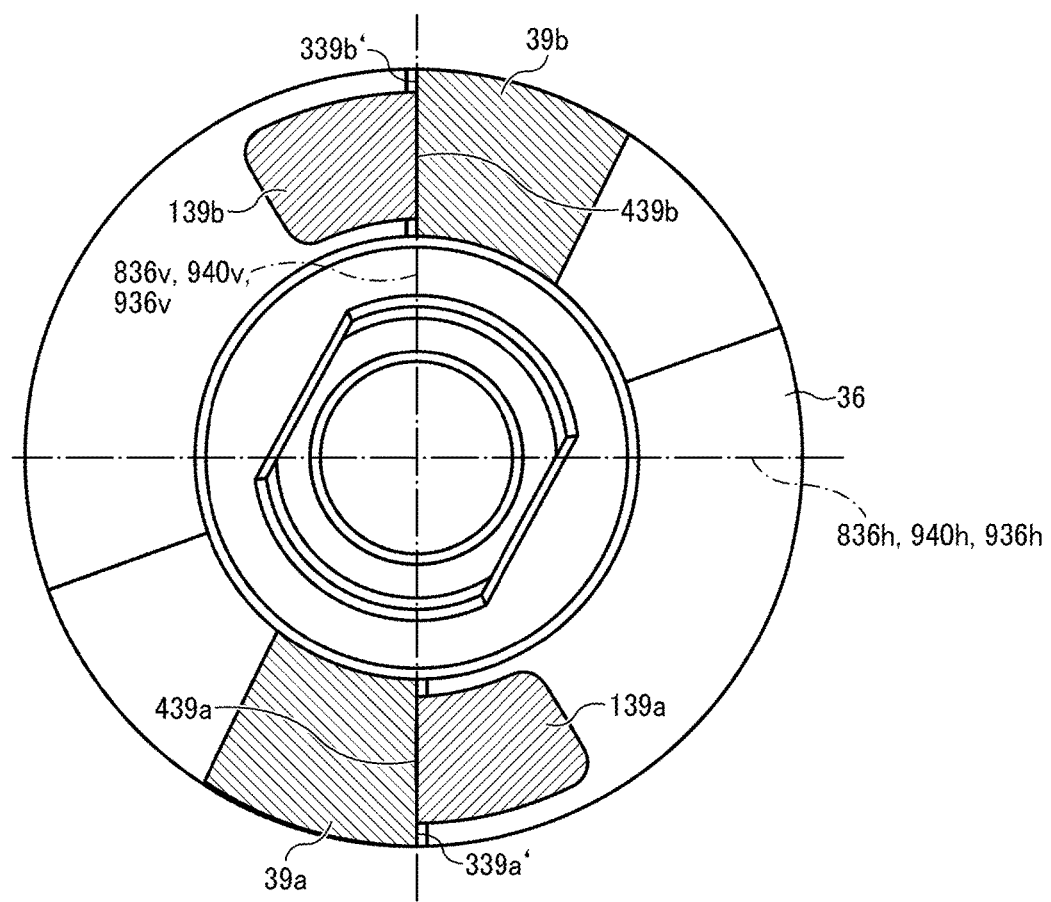
FIG. 23 is a partially enlarged cross-sectional view schematically illustrating the drive joint and the driven joint in a state in which the drive shaft is rotated until the drive joint contacts the driven joint according to a related art.

By contrast, in a related art configuration such as shown in FIG. 23, a drive-side joint contact surface 339b' and the driven-side joint contact surface 439a make a line contact or a surface contact. As a result, the contact condition between the drive joint and the driven joint depends on the surface condition of the parts, hence generating easily an external force in a direction different from the rotation direction.

Figure 22:
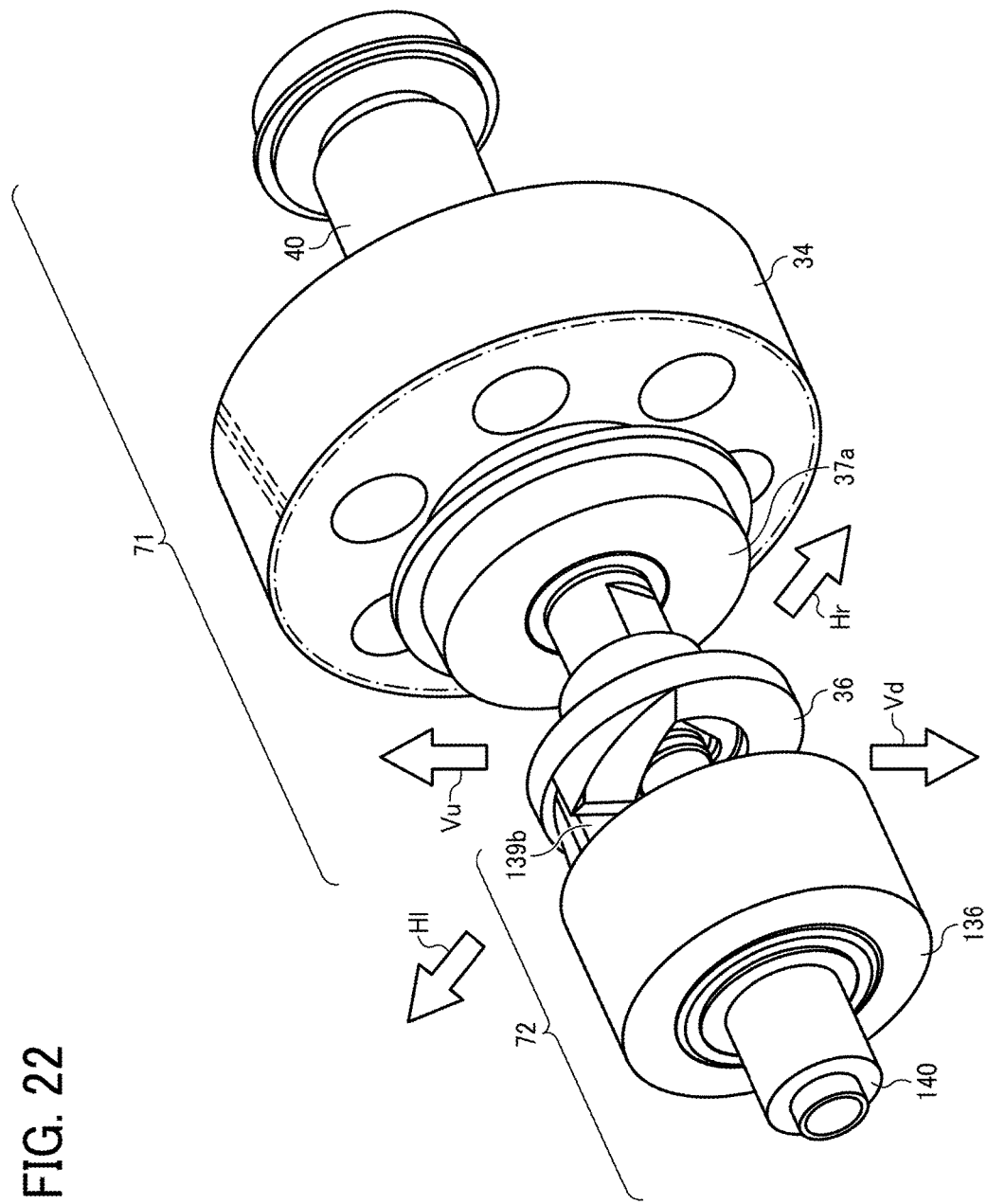
FIG. 22 is a perspective view schematically illustrating the drive shaft and the driven shaft during rotation according to an illustrative embodiment of the present disclosure.

FIG. 22 is a perspective view schematically illustrating the drive shaft 40 and the driven shaft 140 during rotation according to an illustrative embodiment of the present disclosure.

In FIG. 22, a drive shaft assembly 71 includes the drive shaft 40 and the drive joint 36. A driven shaft assembly 72 includes the driven shaft 140 as a rotary shaft on the driven side and the driven joint 136. As illustrated in FIG. 22, displacement directions of the drive shaft assembly 71 when the position of the driven shaft assembly 72 on the driven side is fixed are defined by four directions: a vertical upper direction Vu, a vertical downward direction Vd, a horizontal right direction Hr, and a horizontal left direction Hl.

FIG. 23 is a partially enlarged cross-sectional view schematically illustrating the drive joint and the driven joint in a state in which the drive shaft has been rotated until the drive joint contacts the driven joint according to a related art driving force transmission unit.

As illustrated in FIG. 23, the drive-side joint contact surface 339b' and the driven-side joint contact surface 439b make a line contact or a surface contact. Similarly, a drive-side joint contact surface 339a' and the driven-side joint contact surface 439a make a line contact or a surface contact.

Figure 24:
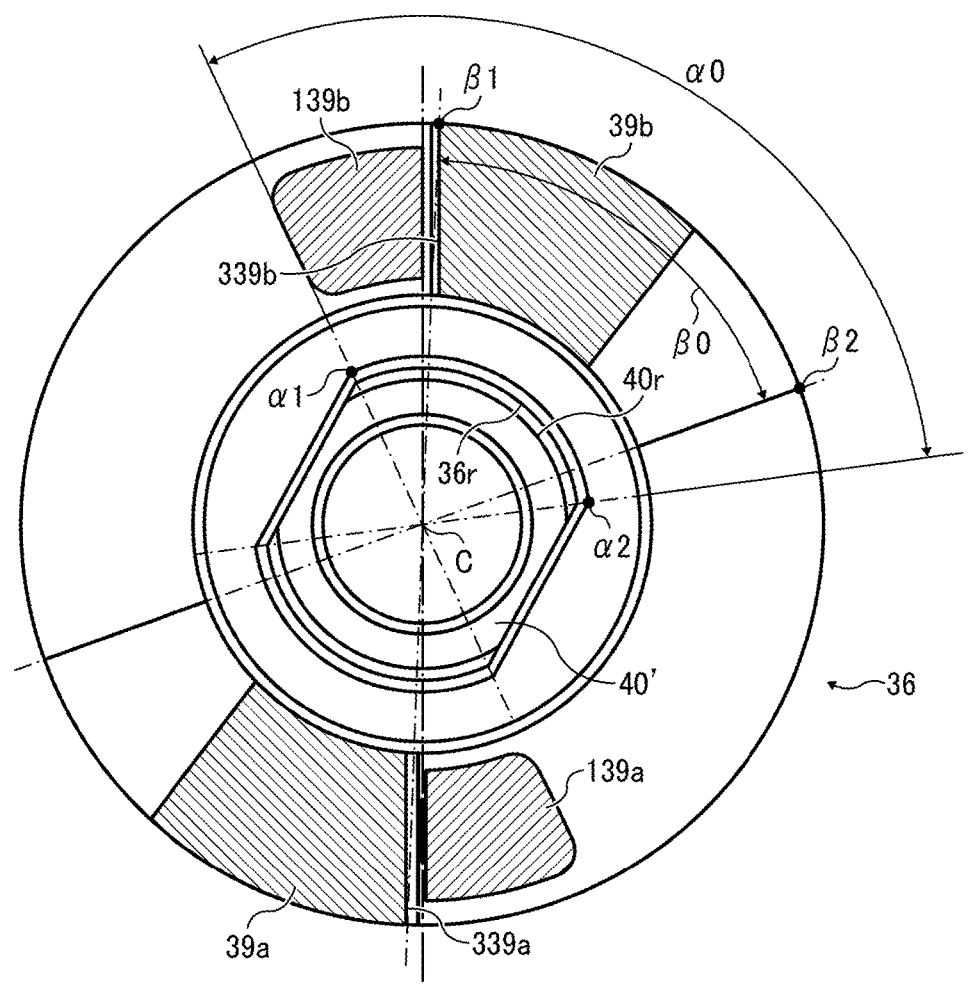
FIG. 24 is a partially enlarged cross-sectional view schematically illustrating the connecting portion of the drive claw portion and the driven claw portion when the drive joint and the driven joint are engaged during rotation according to an illustrative embodiment of the present disclosure.

FIG. 24 is a partially enlarged cross-sectional view schematically illustrating the connecting portion of the drive claws 39a and 39b, and the driven claws 139a and 139b when the drive joint 36 and the driven joint 136 are in the engaged state during rotation according to an illustrative embodiment of the present disclosure.

In FIG. 24, a first imaginary line that extends from a center axis (rotation center) C of the drive shaft 40 through one end portion of the circular arc portion 40r is referred to as α1. Similarly, a second imaginary line that extends from the center axis (rotation center) C of the drive shaft 40 through the other end of the circular arc portion 40r is referred to as α2. A line connecting the center axis (rotation center) C of the drive shaft 40 and the peak near the driven side of the drive claws 39a and 39b is referred to as β1. Similarly, a line connecting the center axis (rotation center) C of the drive shaft 40 and the bottom end portion farthest from the driven side of the drive claws 39a and 39b is referred to as β2. In this case, each of the drive claws 39a and 39b is disposed within an area α0 between the first imaginary line α1 and the second imaginary line α2 including the circular arc portion 36r of the drive joint 36.

Alternatively, at least only the tip portion of the drive claws 39a and 39b on the driven side may be disposed within the area α0 between the first imaginary line α1 and the second imaginary line α2. Alternatively, the entire drive claws 39a and 39b may be disposed within the area α0 between the first imaginary line α1 and the second imaginary line α2.

The above-described position of the claws within the area α0 between the first imaginary area α1 and the second imaginary area α2 is applied to the joint that moves in the direction of thrust along the rotary shaft, preferably. In the present illustrative embodiment, since the drive joint 36 moves in the direction of thrust along the drive shaft 40, the above-described position of the claws is applied to the drive joint 36. In a case in which the driven joint 136 moves in the direction of thrust along the driven shaft 140, the above-described position of the claws may be applied to the driven joint 136.

In FIG. 24, preferably, the angular range [°] of the area α0 satisfies the following equation (Equation 1):

$$(360°/2T)-45° < α0 < (360°/2T)+45°, \qquad \text{<Equation 1>}$$

where T is a number of drive claws 39a and 39b. Preferably, a radius R of curvature of the internal diameter of the drive claws 39a and 39b with the rotation center axis in the center satisfies the following equation (Equation 2):

$$r0 < R < 3×r0, \qquad \text{<Equation 2>}$$

where R is the radius of curvature of the internal diameter of the drive shaft 40 and r0 is a radius of the drive shaft 40. A ratio H1 of a dimension E1 between the circular arc portions of the drive joint 36 and the drive shaft 40 relative to a dimension S1 between the linear portions is expressed by H1=S1/E1.

In this case, the ratio H1 satisfies the following equation $$0.5 < H1 < 2 \quad \text{(Equation 3):}$$

As illustrated in FIG. 24, when the drive claws 39a and 39b are disposed within an area between the first imaginary area α1 and the second imaginary area α2 in the shape of a substantially circular sector in cross section, the drive claws 39a and 39b are prevented from getting damaged. More specifically, when either the drive claw 39a or the drive claw 39b contacts the driven claw, the drive joint 36 may tilt at the place at which the drive joint 36 and the drive shaft 40 are fitted. Even when the drive joint 36 tilts, the circular arc portion 40r of the drive shaft 40 and the circular arc portion 36r of the drive shaft 36 always make a point contact. Accordingly, the contact resistance of the drive shaft 40 and the drive joint 36 is small. With this configuration, even when a force is applied unexpectedly to the drive claws 39a and 39b upon engaging and disengaging the drive joint 36 and the driven joint 136, the drive joint 36 can still move smoothly, hence preventing damage to parts constituting the connecting portion of the drive joint 36, for example.

Figure 25A:
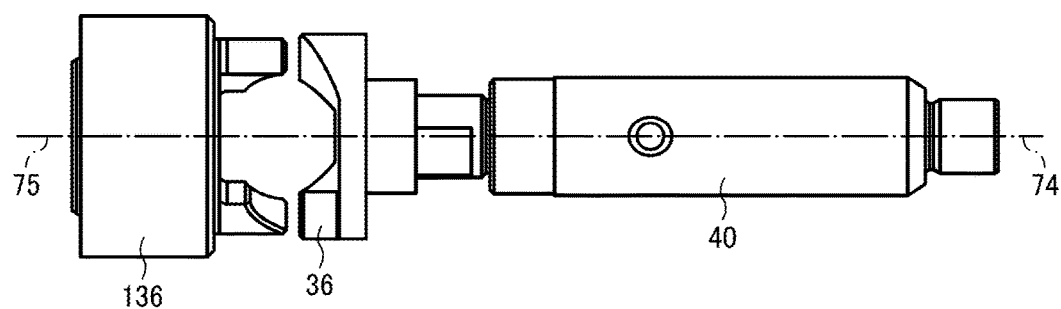
FIG. 25A is a side view schematically illustrating a relative position of the drive shaft and the driven shaft when center axes thereof are aligned according to an illustrative embodiment of the present disclosure.
Figure 25B:
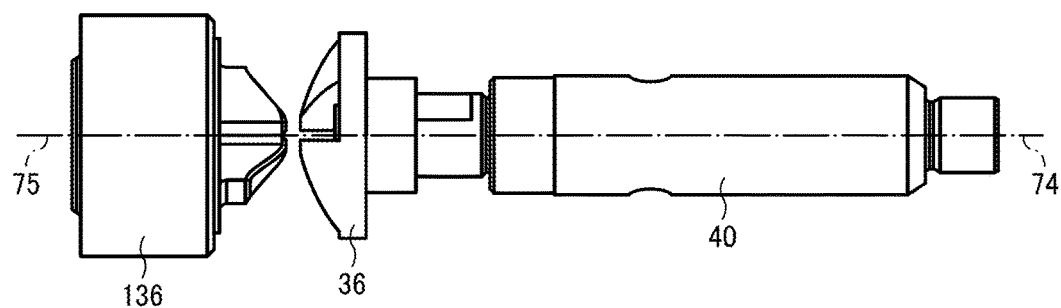
FIG. 25B is a plan view of FIG. 25A.

FIGS. 25A and 25B shows a relative position of the drive shaft 40 and the driven shaft 140 when the center axes are aligned according to an illustrative embodiment of the present disclosure. FIG. 25A is a side view, and FIG. 25B is a top view. In FIGS. 25A and 25B, a center axis (hereinafter referred to as a drive axis) 74 of the drive shaft 40 and a center axis (hereinafter referred to as a driven axis) 75 of the driven shaft 140 are collinear.

Figure 26:
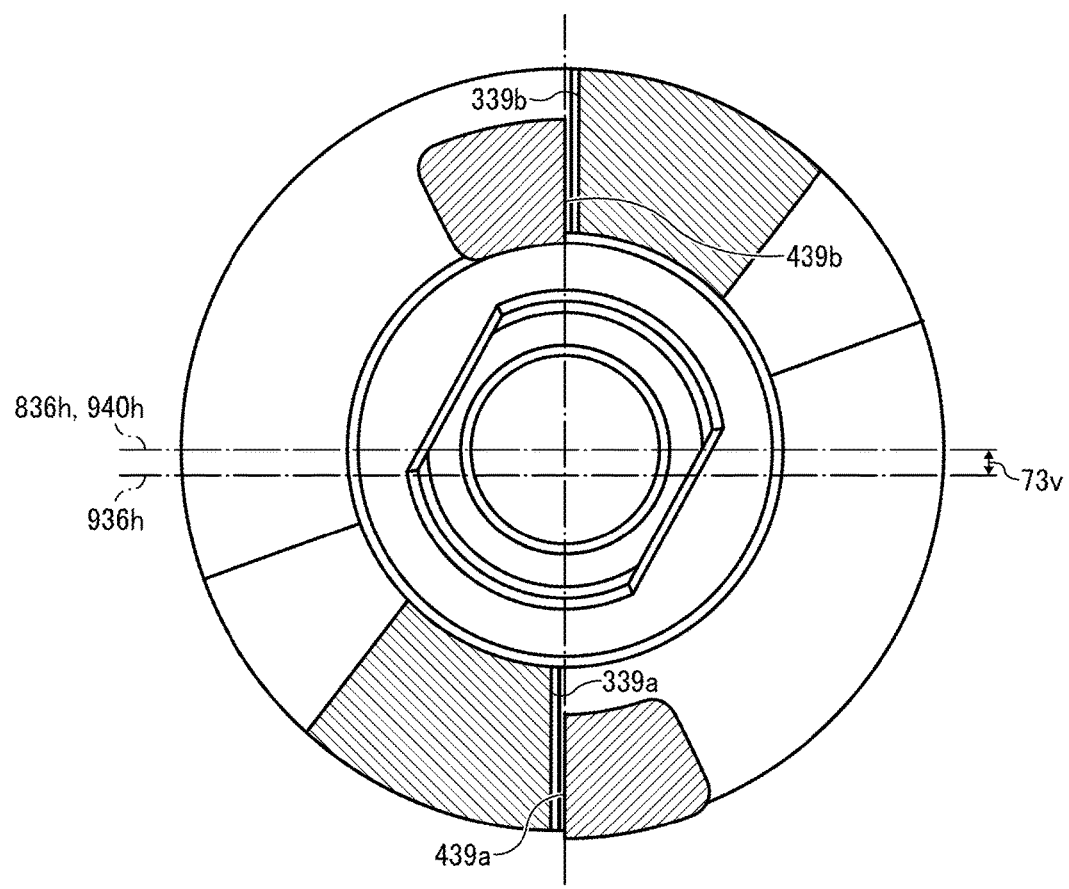
FIG. 26 is a partially enlarged cross-sectional view schematically illustrating the connecting portion of the drive claw portion and the driven claw portion when the drive joint and the driven joint are engaged with the axes of the drive shaft and the driven shaft being misaligned in the driving force transmission unit according to an illustrative embodiment of the present disclosure.

FIG. 26 is a partially enlarged cross-sectional view schematically illustrating the drive claw portion and the driven claw portion at the connecting portion at which the drive joint and the driven joint are fitted with the drive axis and the driven axis being misaligned according to an illustrative embodiment of the present disclosure. FIG. 26 shows a center axis deviation 73v of the drive shaft assembly 71 in the vertical direction when the drive shaft assembly 71 of the drive side shown FIG. 22 is shifted in the vertical, upper direction Vu relative to the driven shaft assembly 72 of the driven side.

In FIG. 26, the driven-side joint contact surfaces 439a and 439b are disposed substantially on the same plane, but the drive-side joint contact surfaces 339a and 339b are shifted horizontally by a certain amount. The center axis deviation 73v in the vertical direction causes the contact position and the contact range of the contact surfaces of the claws of the drive joint 36 and the driven joint 136 to change. There is no significant difference in the contact conditions of the claws of the drive joint 36 and the driven joint 136 as compared with having no center axis deviation 73v in the vertical direction.

Figure 27A:
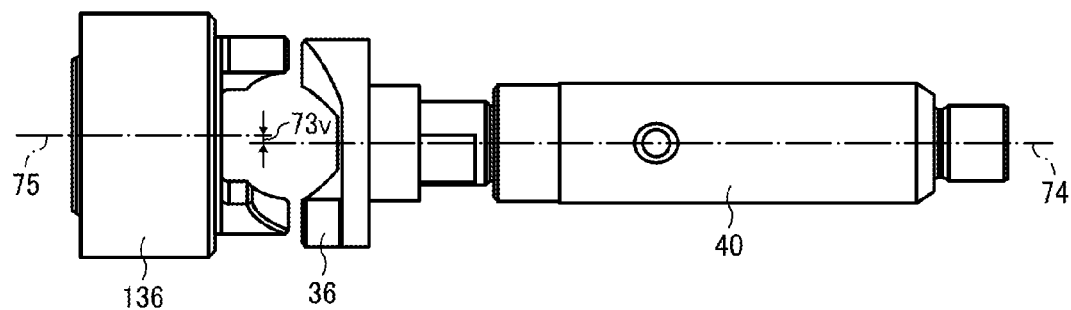
FIG. 27A is a side view schematically illustrating the relative position of the drive shaft and the driven shaft when the center axes thereof are misaligned in a direction (vertical direction) parallel to the contact surface of the claw portion according to an illustrative embodiment of the present disclosure.
Figure 27B:
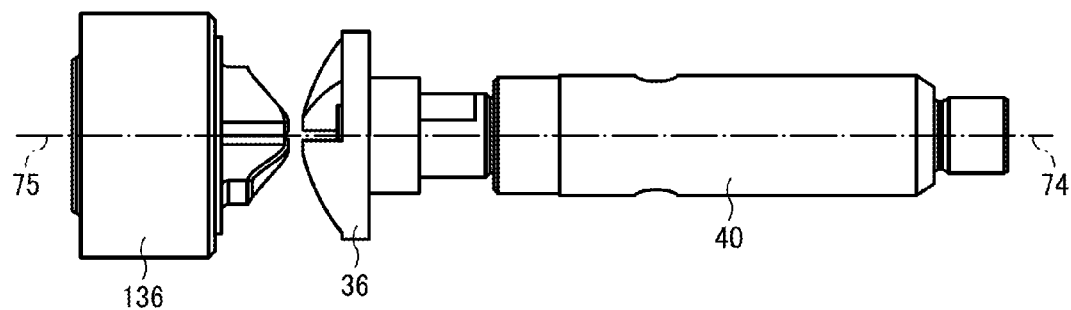
FIG. 27B is a plan view of FIG. 27A.

FIGS. 27A and 27B show a relative position of the drive shaft 40 and the driven shaft 140 when the center axes are misaligned in the direction parallel to the contact surfaces of the claws (up-down direction) in the driving force transmission unit according to the illustrative embodiment. 27A is a side view, and 27B is a top view. In FIGS. 27A and 27B, the drive shaft assembly 71 on the drive side and the driven shaft assembly 72 on the driven side are disposed in a state in which the center of the drive axis 74 and the center of the driven axis 75 are displaced by the amount of the center axis deviation 73v. Preferably, in FIGS. 27A and 27B, the amount of the center axis deviation 73v between the drive shaft 40 and the driven shaft 140 is less than the amount of the gaps (claw displacement amount) 239a and 239b.

Figure 28:
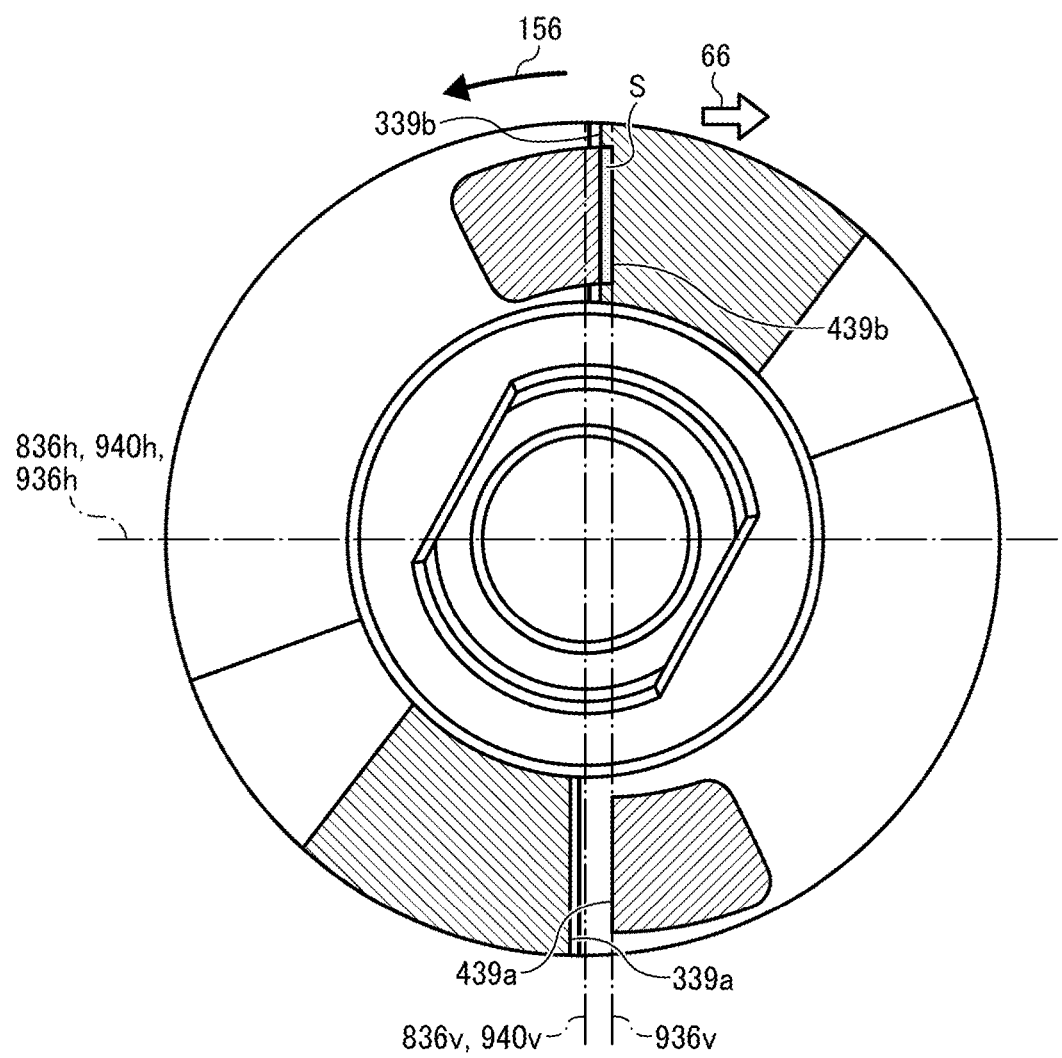
FIG. 28 is a partially enlarged cross-sectional view schematically illustrating the connecting portion of the drive claw portion and the driven claw portion when the drive joint and the driven joint are engaged with the axes of the drive shaft and the driven shaft being misaligned in a horizontal direction according to an illustrative embodiment of the present disclosure.

FIG. 28 is a partially enlarged cross-sectional view schematically illustrating the drive claw portion and the driven claw portion at the connecting portion at which the drive joint and the driven joint are in the engaged state with the drive axis and the driven axis being misaligned in the horizontal direction according to an illustrative embodiment of the present disclosure. FIG. 28 shows a state in which the vertical driven-joint center plane 936v engages while being misaligned relative to the vertical drive-joint center plane 836v and the vertical drive-shaft center plane 940v. In FIG. 28, a reference letter S refers to an interference region. Thus, the engagement state shown in FIG. 28 is not possible in reality. From the state shown in FIG. 28, a thrust force 66 indicated by hollow arrow and its reaction force cause the driven joint 136 to rotate in a driven-joint rotation direction 156 indicated by arrow, and the driven joint 136 meshes with the drive joint 36 in a state in which the rotary driving force is transmittable.

Figure 29A:
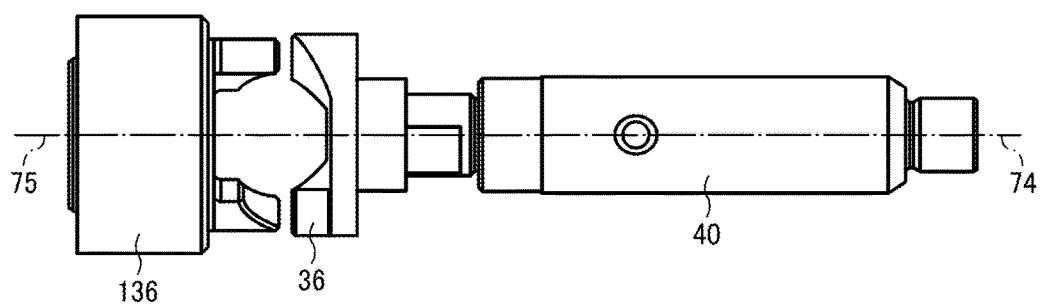
FIG. 29A is a side view schematically illustrating the relative position of the drive shaft and the driven shaft when the center axes thereof are misaligned in a direction perpendicular to the contact surface of the claw portion according to an illustrative embodiment of the present disclosure.
Figure 29B:
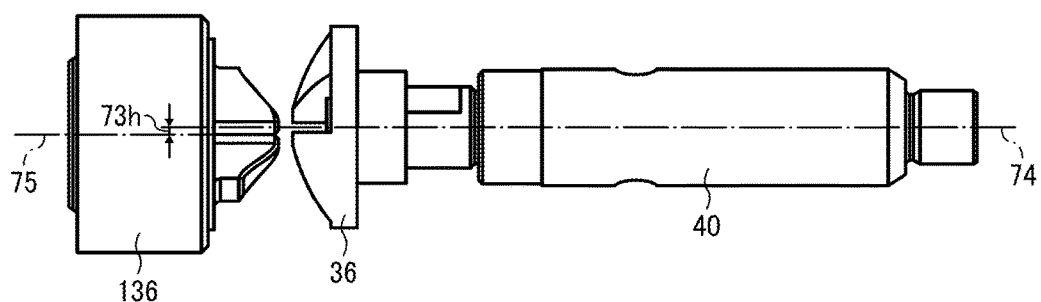
FIG. 29B is a plan view of FIG. 29A.

FIGS. 29A and 29B show a relative position of the drive shaft 40 and the driven shaft 140 when the center axes thereof are misaligned in the direction perpendicular to the contact surfaces of the claw portions in the driving force transmission unit according to the illustrative embodiment. FIG. 29A is a side view, and FIG. 29B is a top view. In FIGS. 29A and 29B, the drive shaft assembly 71 on the drive side and the driven shaft assembly 72 on the driven side are disposed in a state in which the drive axis 74 and the driven axis 75 are misaligned by the amount of the center axis deviation 73h. Preferably, in FIGS. 29A and 29B, the amount of the center axis deviation 73h between the drive shaft 40 and the driven shaft 140 is less than the gaps (claw displacement amount) 239a and 239b. With this configuration, a force in the radial direction is not applied from the drive shaft 40 to the driven shaft 140.

Figure 30:
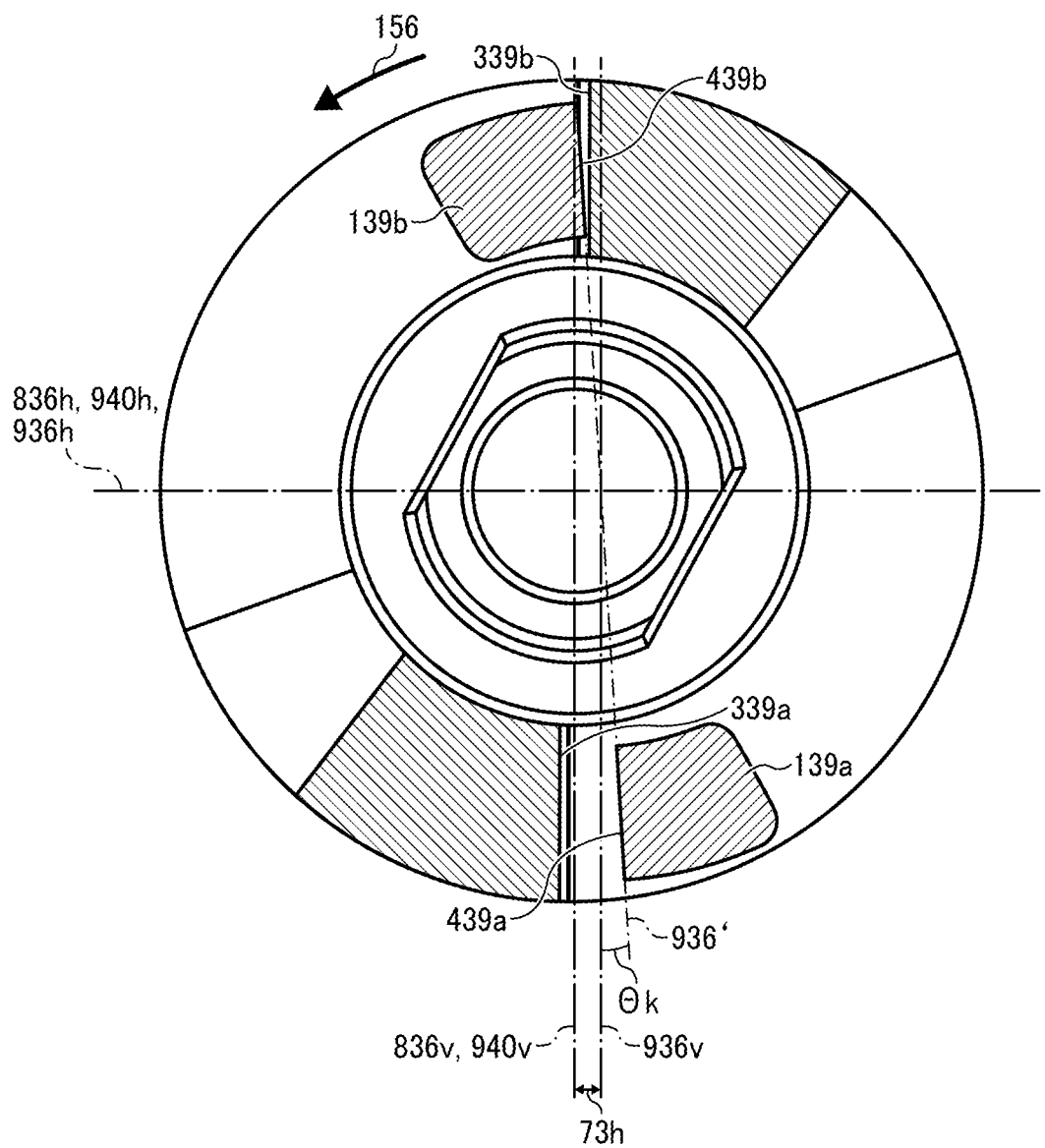
FIG. 30 is a partially enlarged cross-sectional view schematically illustrating the connecting portion of the drive claw portion and the driven claw portion when the drive joint and the driven joint are engaged with the axes of the drive shaft and the driven shaft being misaligned in the horizontal direction according to an illustrative embodiment of the present disclosure.

FIG. 30 is a partially enlarged cross-sectional view schematically illustrating the drive claw portion and the driven claw portion at the connecting portion at which the drive joint and the driven joint are fitted with the drive axis and the driven axis being misaligned in the horizontal direction according to an illustrative embodiment of the present disclosure. FIG. 30 shows the driven joint 136 having rotated in a driven-joint rotation direction 156 from the state shown in FIG. 28.

Figure 31:
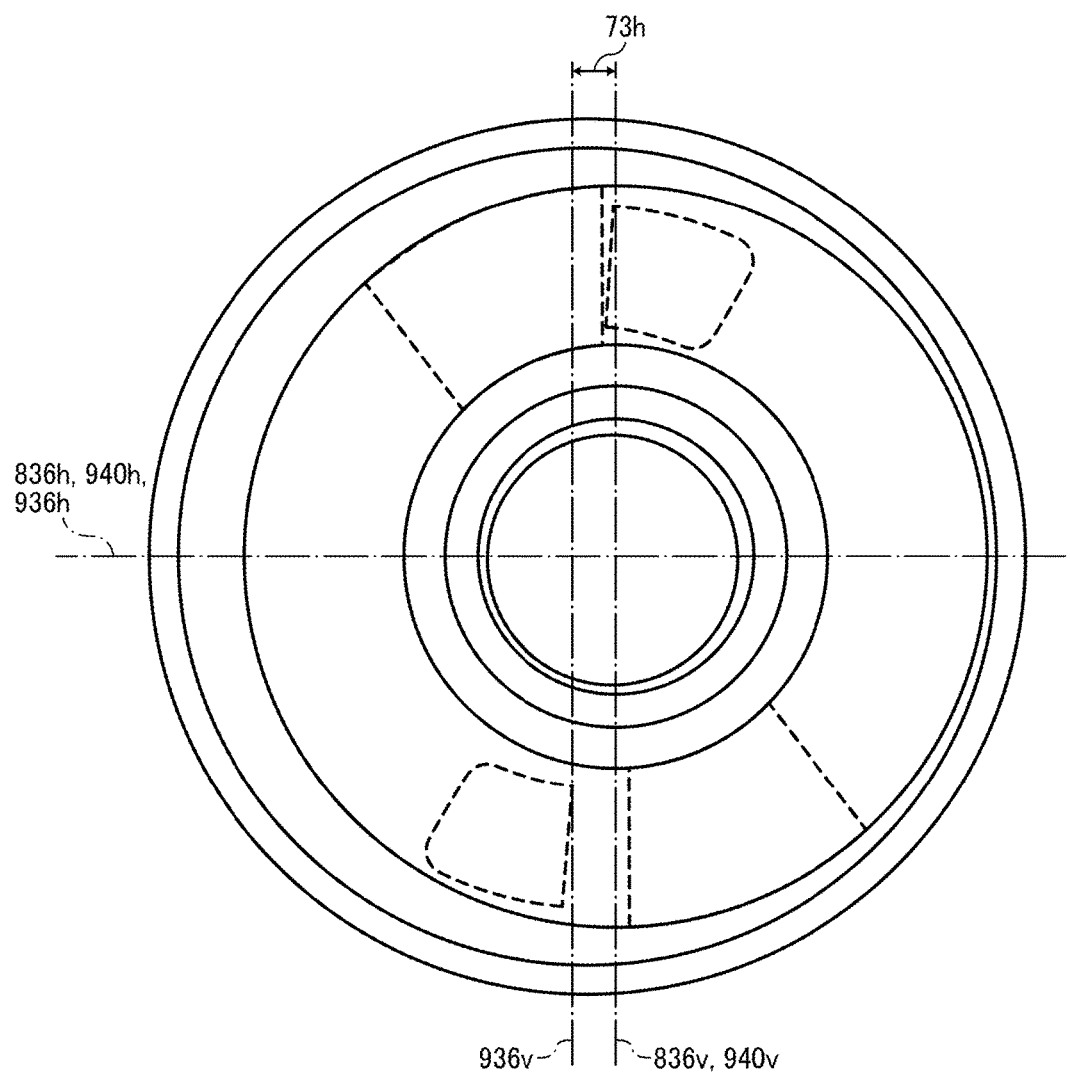
FIG. 31 is a rear view of FIG. 30.

FIG. 31 is a rear view of FIG. 30. FIG. 31 facilitates understanding of the outer shape of the drive joint 36 and the driven joint 136 in relation with the center axis.

In FIGS. 30 and 31, the driven claw 139b and the drive claw 39b make a point contact, and the other pair of the driven claw 139a and the drive claw 39a transmits the rotary driving force with an angle θk (shown in FIG. 30) formed between the driven claw 139a and the drive claw 39a. In a case in which the rotary driving force is transmitted while the rotation center axes (center axis lines) of the drive shaft 40 and the driven shaft 140 are misaligned, the drive claw and the driven claw also make a point contact. However, the start point at which the drive claw and the driven claw start to contact is located on the inner diameter side of radius of the driven claw as compared with having no displacement in the rotation center axes.

Figure 32:
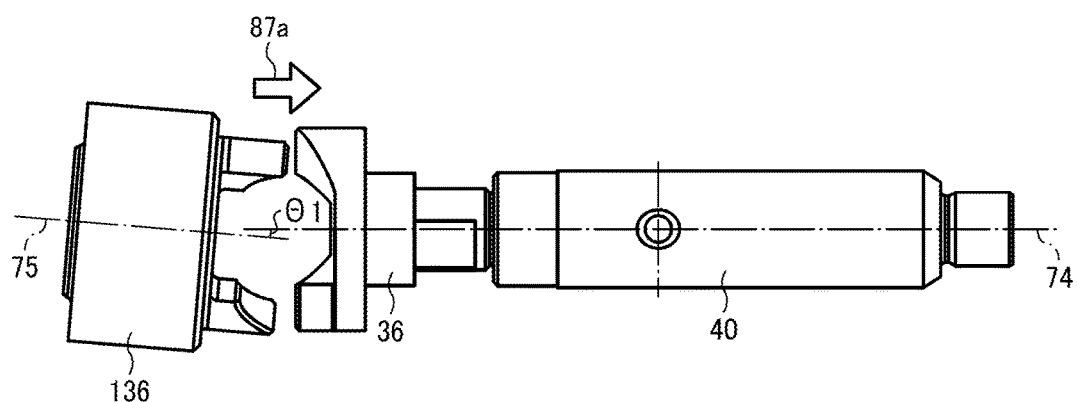
FIG. 32 is a side view schematically illustrating the drive shaft and the driven shaft when the driven shaft is inclined relative to the drive shaft.

FIG. 32 is a side view schematically illustrating the drive shaft and the driven shaft when the driven shaft is inclined relative to the drive shaft in the driving force transmission unit of the illustrative embodiment.

In FIG. 32, the driven axis 75 is inclined by an angle θ1 relative to the drive axis 74. As a result, the driven claw 139a (or 139*b*) partially contacts the drive claw 39*a* (or 39*b*) easily, causing the driven joint 136 to push the drive joint 36 at the external force 87*a* (pressing force). In such a case, by disposing the drive claw 39*a* in a manner shown in FIG. 24 the drive claw 39*a* (or 39*b*) and the driven claw 139*a* (139*b*) are prevented from getting damaged.

Figure 33:
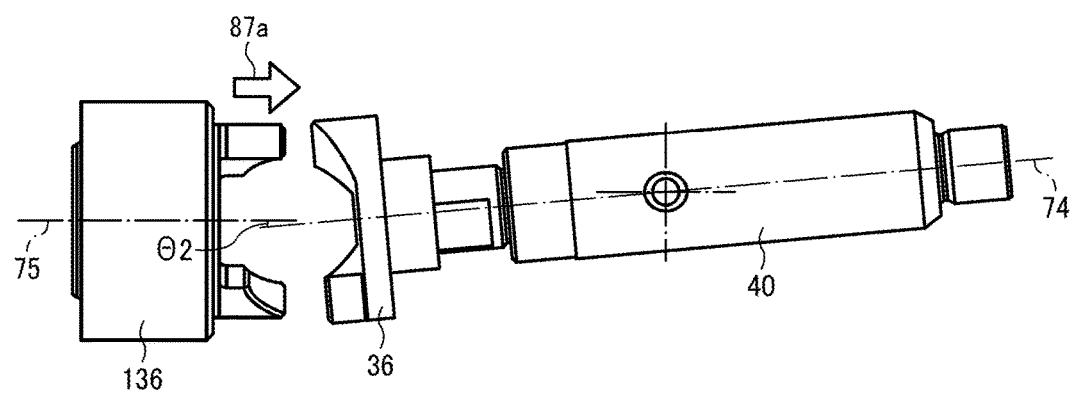
FIG. 33 is a side view schematically illustrating the drive shaft and the driven shaft when the drive shaft is inclined relative to the driven shaft.

FIG. 33 is a side view schematically illustrating the drive shaft and the driven shaft when the drive shaft is inclined relative to the driven shaft in the driving force transmission unit of the illustrative embodiment.

In FIG. 33, the drive axis 74 is inclined by an angle θ2 relative to the driven axis 75. As a result, the driven claw 139*a* (or 139*b*) partially contacts the drive claw 39*a* (or 39*b*) easily, causing the driven joint 136 to push the drive joint 36 at the pressing force 87*a*. In such a case, by disposing the drive claw 39*a* in a manner shown in FIG. 24 the drive claw 39*a* (or 39*b*) and the driven claw 139*a* (139*b*) are prevented from getting damaged.

The description has been provided of a configuration in which the spring 35 is disposed on the drive side, and the drive joint 36 is slidable. Alternatively, the present disclosure may be applied to a configuration in which the spring 35 may be disposed on the driven side and the driven joint 136 is slidable.

The description has been provided of a configuration in which a plurality of drive claws, i.e., the drive claws 39*a* and 39*b*, and a plurality of driven claws, i.e., the driven claws 139*a* and 139*b* are provided. Alternatively, the present disclosure may be applied to a configuration with a single drive claw and a single driven claw.

Although the embodiment of the present disclosure has been described above, the present disclosure is not limited to the foregoing embodiments, but a variety of modifications can naturally be made within the scope of the present disclosure.

(Aspect A)

According to an aspect A, a driving force transmission unit includes a first coupling such as the drive joint 36 to transmit a rotary driving force, a second coupling such as a driven joint 136, and a rotary shaft such as the drive shaft 40 connected to the first coupling. The first coupling includes a first contact portion such as the drive-side joint contact surfaces 339*a* and 339*b*, and the hole 36', the inner circumferential of which has a rounded rectangular shape in cross section including the circular arc portion 36*r*. The second coupling includes a second contact portion such as the driven-side joint contact surfaces 439*a* and 439*b* disposed at a position facing to the first contact portion to contact along a direction of rotation of the drive joint. The rotary shaft includes the shaft portion 40', the outer circumferential surface of which has a rounded rectangular shape in cross section including the circular arc portion 40*r*. The shaft portion of the rotary shaft is inserted into the hole 36'. As viewed from the second coupling side, the first contact portion is disposed between the first imaginary area α1 extending from the center C of rotation of the rotary shaft through one end of the circular arc portion 40*r* of the rotary shaft in the direction of rotation of the rotary shaft and the second imaginary area α2 extending from the center C through the other end of the circular arc portion 40*r*, and within the area α0 including the circular arc portion 36*r*.

With this configuration, as described above, the first contact portion of the first coupling is disposed within the predetermined area, i.e., the area α0.

As viewed from the second coupling side, the predetermined area α0 is disposed between the first imaginary area α1 extending from the center C of rotation of the rotary shaft through one end of the circular arc portion 40*r* of the rotary shaft in the direction of rotation of the rotary shaft and the second imaginary area α2 extending from the center C through the other end of the circular arc portion 40*r*, and including the circular arc portion 36*r* of the hole. Since the first contact portion of the first coupling is disposed in the predetermined area α0, the first coupling and the second coupling are prevented from getting damaged when unexpected force is applied to the first contact portion upon engagement and disengagement of the first coupling and the second coupling.

More specifically, upon engagement and disengagement of the couplings, if unexpected force is applied to the first contact portion of the first coupling, the first coupling may tilt relative to the rotary shaft. When the first coupling tilts, the linear portion of inner circumferential surface of the hole of the first coupling and the linear portion of the outer circumferential surface of the shaft portion of the rotary shaft do not contact, but the circular arc portion of the hole and the circular arc portion of the shaft portion contact. The shaft portion of the rotary shaft is inserted into the first coupling. Thus, the curvature of the circular arc portion of the inner circumferential surface of the first coupling is slightly smaller than that of the circular arc portion of the outer circumferential surface of the rotary shaft. In other words, the radius of the curvature of the inner circumferential surface of the circular arc portion of the first coupling is greater than that of the circular arc portion of the outer circumferential surface of the rotary shaft.

Furthermore, as viewed from the cross section orthogonal to the rotation center axis of the rotary shaft, the difference between the curvature (the radius of the curvature) of the circular arc portion of the first coupling and that of the circular arc portion of the rotary shaft is even greater due to the inclination of the first coupling. Therefore, the circular arc portion of the hole of the first coupling and the circular arc portion of the shaft portion of the rotary shaft make a point contact, and do not contact in a line contact or over a plane contact.

As described above, in a case in which the first coupling tilts relative to the rotary shaft, the inner circumferential surface of the hole of the first coupling and the outer circumferential surface of the shaft portion of the rotary shaft do not contact at the linear portions, but contact at the circular arc portions. That is, the inner circumferential surface of the hole of the first coupling and the outer circumferential surface of the shaft portion of the rotary shaft make a point contact. With this configuration, contact resistance between the first coupling and the rotary shaft can be reduced as compared with a case in which the inner circumferential surface of the hole of the first coupling and the outer circumferential surface of the shaft portion of the rotary shaft make a line contact or over a plane. Unexpected force is not applied to the first contact portion of the first coupling, thereby preventing damage to the contact portion of the coupling.

(Aspect B)

According to Aspect A, the first coupling includes projections such as the drive claws 39*a* and 39*b* on the opposite side to the second coupling. The first contact portion is formed on one end of the projection in the direction of rotation, and the entire projection is disposed within the area α0. Accordingly, as described above, unexpected force is not applied to the projection of one of the couplings, thereby preventing damage to the projection of the first coupling.

(Aspect C)

According to Aspect A or Aspect B, the first coupling includes a plurality of the first contact portions and the second coupling includes a plurality of the second contact portions along the direction of rotation, and the plurality of the first contact portions is disposed in the area α0. Accordingly, as described above, upon engagement of the first coupling and the second coupling, the first coupling is prevented from tilting relative to the rotary shaft.

(Aspect D)

According to any one of Aspects A through C, the contact portion such as the drive-side joint contact surfaces 339a and 339b of the coupling such as the drive joint 36 on the drive side is deviated from an imaginary center plane P1 including the rotation center axis C of the rotary shaft connected to the coupling on the drive side. With this configuration, as described above, upon transmission of the rotary driving force from the coupling on the drive side to the coupling on the driven side, the contact portion of the coupling on the drive side and the contact portion of the coupling on the driven side make a point contact, thereby preventing generation of a force in the direction other than the direction of rotation from the contact portion of the coupling on the drive side to the contact portion of the coupling on the driven side. Accordingly, the driving force is transmitted effectively from the drive side to the driven side. Furthermore, upon transmission of the driving force, generation of vibration in the direction of rotation, displacement of the coupling in the thrust direction along the rotary shaft, noise and abrasion due to micro-vibration in the thrust direction, and so forth are suppressed, if not prevented entirely.

(Aspect E)

According to any one of Aspects A through C, the contact portion such as the driven-side joint contact surfaces 439a and 439b of the coupling on the driven side such as the driven joint 136 is deviated from the imaginary center plane including the rotation center axis of the rotary shaft connected to the coupling on the driven side. With this configuration, as described above, upon transmission of the rotary driving force from the coupling on the drive side to the coupling on the driven side, the contact portion of the coupling on the drive side and the contact portion of the coupling on the driven side make a point contact. Generation of a force in the direction other than the direction of rotation from the contact portion of the coupling on the drive side to the contact portion of the coupling on the driven side is suppressed, if not prevented entirely. Accordingly, the driving force is transmitted effectively from the drive side to the driven side. Furthermore, upon transmission of the driving force generation of vibration in the direction of rotation, displacement of the coupling in the thrust direction along the rotary shaft, noise and abrasion due to micro-vibration in the thrust direction, and so forth are suppressed, if not prevented entirely.

(Aspect F)

According to Aspect D, the contact portion of the coupling on the drive side is disposed away from the center of the coupling on the drive side. With this configuration, as described above, upon transmission of the rotary driving force from the coupling on the drive side to the coupling on the driven side, the contact portion of the coupling on the drive side and the contact portion of the coupling on the driven side make a point contact more reliably.

(Aspect G)

According to Aspect E, the contact portion of the coupling on the driven side is disposed away from the center of the coupling on the drive side. With this configuration, as described above, upon transmission of the rotary driving force from the coupling on the drive side to the coupling on the driven side, the contact portion of the coupling on the drive side and the contact portion of the coupling on the driven side make a point contact more reliably.

(Aspect H)

According to Aspect D or Aspect F, an amount of deviation of the contact portion of the coupling on the drive side is greater than an amount of deviation between the rotation center axis of the rotary shaft connected to the coupling on the drive side and the rotation center axis of the rotary shaft connected to the coupling on the driven side parallel with the rotation center axis of the rotary shaft connected to the coupling on the drive side, and an amount of deviation between the rotation center axis of the rotary shaft on the drive side and the rotation center axis of the rotary shaft on the driven side at the connecting portion at which the coupling on the drive side and the coupling on the driven side are connected attributed to inclination of the rotation center axis between the rotary shaft on the drive side and the rotary shaft on the driven side. With this configuration, as described above, even when the rotation center axis of the rotary shaft on the drive side and the rotation center axis of the rotary shaft on the driven side are misaligned, the contact portions make a point contact more reliably upon transmission of the rotary driving force.

(Aspect I)

According to Aspect E or Aspect G, an amount of deviation of the contact portion of the coupling on the drive side is greater than an amount of deviation between a rotation center axis of the rotary shaft connected to the coupling on the drive side and a rotation center axis of the rotary shaft connected to the coupling on the driven side parallel with the rotation center axis of the rotary shaft connected to the coupling on the drive side, and an amount of deviation between the rotation center axis of the rotary shaft on the drive side and the rotation center axis of the rotary shaft on the driven side at the connecting portion at which the coupling on the drive side and the coupling on the driven side are connected, attributed to inclination of the rotation center axis between the rotary shaft on the drive side and the rotary shaft on the driven side. With this configuration, as described above, even when the rotation center axis of the rotary shaft on the drive side and the rotation center axis of the rotary shaft on the driven side are misaligned, the contact portions can make a point contact more reliably upon transmission of the rotary driving force.

(Aspect J)

According to Aspect H, the direction of deviation of the contact portion of the coupling on the drive side is not parallel to the direction of deviation of the rotation center axis, but is angled. With this configuration, as described above, upon transmission of the rotary driving force, the contact portion of the coupling on the drive side and the contact portion of the coupling on the driven side make a point contact more reliably (Aspect K)

According to Aspect I, the direction of deviation of the contact portion of the coupling of the driven side is not parallel to the direction of deviation of the rotation center axis, but is angled. With this configuration, as described above, upon transmission of the rotary driving force, the contact portion of the coupling on the drive side and the contact portion of the coupling on the driven side make a point contact more reliably.

(Aspect L)

An image forming apparatus includes the drive transmission unit according to any one of Aspects A through K. With this configuration, as described above, upon engaging and disengaging the coupling on the drive side and the coupling on the driven side in the driving force transmission unit of the image forming apparatus, the couplings are prevented from getting damaged.

According to an aspect of this disclosure, the present invention is employed in the image forming apparatus. The image forming apparatus includes, but is not limited to, an electrophotographic image forming apparatus, a copier, a printer, a facsimile machine, and a digital multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. A driving force transmission unit, comprising:
a first coupling to transmit a rotary driving force, the first coupling including a first contact portion and a hole, an inner circumferential surface of the hole having a rounded rectangular shape in cross section including a circular arc portion;
a second coupling including a second contact portion disposed at a position facing the first contact portion to contact the first contact portion along a direction of rotation of the second coupling; and
a first rotary shaft connected to the first coupling, the first rotary shaft including a shaft portion, an outer circumferential surface of the shaft portion having a rounded rectangular shape in cross section including a circular arc portion inserted into the hole of the first coupling,
the first contact portion being disposed between a first imaginary line extending from a center of rotation of the first rotary shaft passing through one end of the circular arc portion of the first rotary shaft and a second imaginary line extending from the center of rotation of the first rotary shaft passing through the other end of the circular arc portion in a direction of rotation of the first rotary shaft, and within a first area including the circular arc portion of the hole as viewed from the second coupling side,
the first coupling includes a first projection having the first contact portion;
the second coupling includes a second projection having the second contact portion and disposed adjacent to the first projection, and
a radius of an outer circumference of the first projection, relative to the center of rotation, is different from a radius of an outer circumference of the second projection, relative to the center of rotation.

2. The driving force transmission unit according to claim 1,
wherein the first contact portion is on one end of the first projection in a direction of rotation of the first coupling, and the entire first projection is disposed within the first area.

3. The driving force transmission unit according to claim 1, wherein the first coupling includes, as the first contact portion, a plurality of first contact portions in a direction of rotation of the first coupling, and the second coupling includes, as the second contact portion, a plurality of second contact portions in the direction of rotation of the second coupling, and
wherein the plurality of first contact portions is disposed in the first area.

4. The driving force transmission unit according to claim 1, wherein the first coupling is a drive coupling and the first contact portion is deviated from an imaginary center plane including a rotation center axis of the first rotary shaft.

5. The driving force transmission unit according to claim 4, wherein the first contact portion is deviated away from a center of the first coupling.

6. The driving force transmission unit according to claim 4, further comprising a second rotary shaft connected to the second coupling,
wherein an amount of deviation of the first contact portion from the imaginary center plane including the rotation center axis of the first rotary shaft is greater than at least one of an amount of liner axial incongruity between the rotation center axis of the first rotary shaft and a rotation center axis of the second rotary shaft and an amount of deviation between the rotation center axis of the first rotary shaft and the rotation center axis of the second rotary shaft at a connecting portion at which the first coupling and the second coupling are connected, attributed to angular axial incongruity between the rotation center axis of the first rotary shaft and the rotation center axis of the second rotary shaft.

7. The driving force transmission unit according to claim 6, wherein the direction of deviation of the first contact portion is not parallel with a direction of the parallel shift.

8. The driving force transmission unit according to claim 1, further comprising a second rotary shaft connected to the second coupling,
wherein the second coupling is a driven coupling, and the second contact portion is deviated from an imaginary center plane including a rotation center axis of the second rotary shaft.

9. The driving force transmission unit according to claim 8, wherein the second contact portion is deviated away from a center of the second coupling.

10. The driving force transmission unit according to claim 8, wherein an amount of deviation of the second contact portion from the imaginary center plane including the rotation center axis of the second rotary shaft is greater than at least one of an amount of liner axial incongruity between a rotation center axis of the first rotary shaft and the rotation center axis of the second rotary shaft and an amount of deviation between the rotation center axis of the first rotary shaft and the rotation center axis of the second rotary shaft at a connecting portion at which the first coupling and the second coupling are connected, attributed to angular axial incongruity between the rotation center axis of the first rotary shaft and the rotation center axis of the second rotary shaft.

11. The driving force transmission unit according to claim 10, wherein the direction of deviation of the second contact portion is not parallel with a direction of the parallel shift.

12. An image forming apparatus, comprising:
   a rotary member; and
   the driving force transmission unit according to claim 1 to rotatably drive the rotary member.

* * * * *